(12) United States Patent
Ceekala et al.

(10) Patent No.: US 11,171,804 B2
(45) Date of Patent: Nov. 9, 2021

(54) COMMON BUS DATA FLOW FOR SERIALLY CHAINED DEVICES

(71) Applicant: Texas Instruments Incorporated, Dallas, TX (US)

(72) Inventors: Vijaya Ceekala, San Jose, CA (US); Xin Liu, Saratoga, CA (US); Justin Prayogo, Danville, CA (US); Sinjeet Parekh, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 112 days.

(21) Appl. No.: 16/660,846

(22) Filed: Oct. 23, 2019

(65) Prior Publication Data

US 2020/0374152 A1 Nov. 26, 2020

Related U.S. Application Data

(63) Continuation-in-part of application No. 16/578,759, filed on Sep. 23, 2019, which is a continuation-in-part
(Continued)

(51) Int. Cl.
*H04L 12/40* (2006.01)
*H04L 12/741* (2013.01)
*H04L 29/12* (2006.01)

(52) U.S. Cl.
CPC .. *H04L 12/40013* (2013.01); *H04L 12/40032* (2013.01); *H04L 45/74* (2013.01); *H04L 61/2596* (2013.01); *H04L 2012/40273* (2013.01)

(58) Field of Classification Search
None
See application file for complete search history.

(56) References Cited

U.S. PATENT DOCUMENTS 7,362,779 B1 * 4/2008 Zabezhinsky .......... H04J 3/1611
370/512
9,128,690 B2 9/2015 Lotzenburger et al.
(Continued)

FOREIGN PATENT DOCUMENTS

GB 2560570 9/2018
WO 2013090565 6/2013
(Continued)

OTHER PUBLICATIONS

International Search Report in corresponding PCT Application No. PCT/2020/056968, dated Feb. 11, 2021 (2 pages).
(Continued)

*Primary Examiner* — Lonnie V Sweet
(74) *Attorney, Agent, or Firm* — John R. Pessetto; Charles A. Brill; Frank D. Cimino

(57) ABSTRACT

In described examples, a circuit includes a system bus controller having a first downstream port and is configured to generate a first downstream frame responsive to a first local bus transmission received by a first local bus controller, and to generate a second downstream frame responsive to a second local bus transmission received by a second local bus controller. The system bus controller is configured to generate a downstream aggregate frame responsive to the first downstream frame and the second downstream frame and is configured to initiate transmission of the downstream aggregate frame at the first downstream port. The system bus controller is adapted to receive an upstream aggregate frame that includes a first upstream frame and a second upstream frame and is configured to generate a first upstream transmission responsive to the first upstream frame and to generate the second upstream transmission responsive to the second upstream frame.

7 Claims, 19 Drawing Sheets

Related U.S. Application Data of application No. 16/420,396, filed on May 23, 2019, now Pat. No. 10,904,478.

(56) References Cited

U.S. PATENT DOCUMENTS

| | | | |
|---|---|---|---|
| 9,363,067 | B2 | 6/2016 | Ceekala et al. |
| 2001/0012692 | A1* | 8/2001 | Miller .................... H05K 3/26 |
| | | | 438/669 |
| 2002/0116705 | A1 | 8/2002 | Perlman et al. |
| 2002/0118696 | A1* | 8/2002 | Suda .................... H04W 28/06 |
| | | | 370/432 |
| 2007/0255885 | A1 | 11/2007 | Bohm |
| 2008/0175587 | A1 | 7/2008 | Jensen |
| 2009/0319714 | A1* | 12/2009 | James ................ G06F 13/1642 |
| | | | 710/308 |
| 2010/0155493 | A1 | 6/2010 | Russell |
| 2012/0062800 | A1 | 3/2012 | Sisto et al. |
| 2013/0191570 | A1 | 7/2013 | Lee |
| 2014/0040477 | A1 | 2/2014 | King et al. |
| 2016/0359741 | A1* | 12/2016 | Cooper .................... H04L 45/74 |
| 2017/0010329 | A1* | 1/2017 | Tang ........................ H04Q 9/00 |
| 2018/0060269 | A1* | 3/2018 | Kessler ............... G06F 13/4022 |
| 2019/0044995 | A1 | 2/2019 | Amidei et al. |
| 2019/0289098 | A1 | 9/2019 | Chen |
| 2019/0313053 | A1 | 10/2019 | Chane et al. |

FOREIGN PATENT DOCUMENTS

| | | |
|---|---|---|
| WO | 2014039980 | 3/2014 |
| WO | 2016070197 | 5/2016 |

OTHER PUBLICATIONS

International Search Report in corresponding PCT Application No. PCT/2020/04489, dated Jul. 30, 2020 (2 pages).

International Search Report in corresponding PCT Application No. PCT/2020/034495, dated Aug. 13, 2020 (2 pages).

* cited by examiner

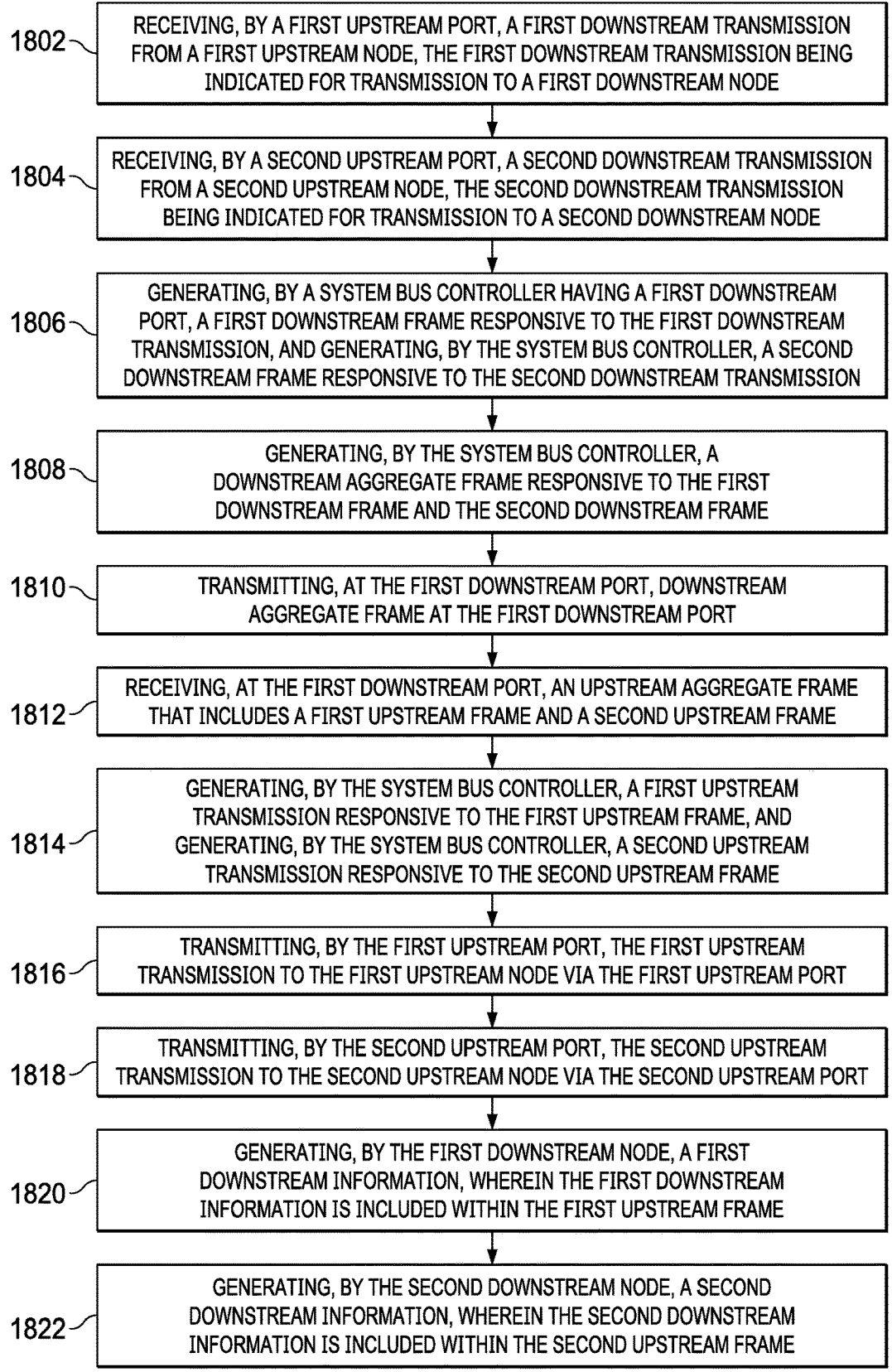

COMMON BUS DATA FLOW FOR SERIALLY CHAINED DEVICES

CROSS-REFERENCE TO RELATED APPLICATIONS

This continuation-in-part application claims priority to U.S. patent application Ser. No. 16/578,759, filed Sep. 23, 2019, which is a continuation-in-part of U.S. patent application Ser. No. 16/420,396, filed May 23, 2019, all of which are incorporated herein by reference in their entirety.

BACKGROUND

In some electronic systems, various components are coupled by a physical layer that can include connectors and electrical wiring. In some applications, limits on the functionality of the various components can be constrained by the cost, size, and numbers of the connectors and/or the cost, size, and numbers of individual wires in the electrical wiring.

SUMMARY

In described examples, a circuit includes a system bus controller having a first downstream port and is configured to generate a first downstream frame responsive to a first local bus transmission received by a first local bus controller, and to generate a second downstream frame responsive to a second local bus transmission received by a second local bus controller. The system bus controller is configured to generate a downstream aggregate frame responsive to the first downstream frame and the second downstream frame and is configured to initiate transmission of the downstream aggregate frame at the first downstream port. The system bus controller is adapted to receive an upstream aggregate frame that includes a first upstream frame and a second upstream frame, and is configured to generate a first upstream transmission responsive to the first upstream frame and to generate the second upstream transmission responsive to the second upstream frame.

BRIEF DESCRIPTION OF THE DRAWINGS

FIG. 18 is a flow diagram of an example method of selected forwarding of communications of virtualized network entities of the example system of FIG. 17A and FIG. 17B.

DETAILED DESCRIPTION

Figure 1:
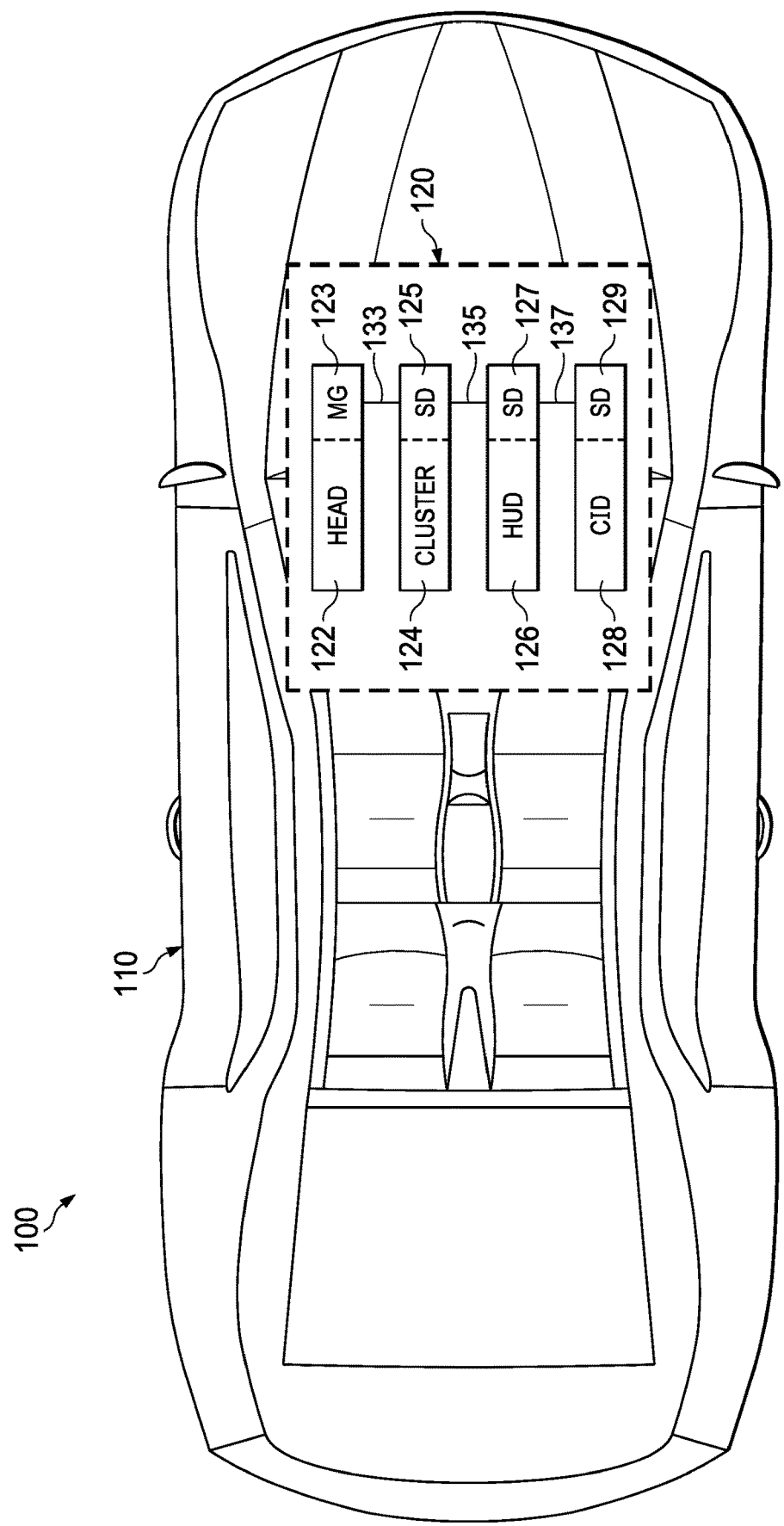
FIG. 1 is a system diagram showing an example vehicle that includes an example system adapted to selectively forward communications between serially chained devices of the example system.

In the drawings, like reference numerals refer to like elements, and the various features are not necessarily drawn to scale.

Various electronic systems employ components coupled together to comprise the system. As the functionality of the system increases, the complexities of the interconnections increase. As more functionality is added to the system (e.g., in response to increased integration and processing power), the numbers of terminals of the connectors increase, which, in turn, increase the size, complexity, and/or cost of the connectors.

Some electronic systems can be installed in a transportation platform (such as an airplane or motor vehicle). Limitations in the structure of the mobile platform (e.g., due to human factors, safety considerations, and aerodynamic performance) can limit the space otherwise afforded to the connectors and cabling of an electronic system. Further, access to the connectors and cabling (e.g., for testing, replacement, and/or repair) can be limited (which can increase operating costs), such as when the electronic system is installed in a dashboard (that can include at least one airbag) of a vehicle.

An example of an electronic system that can be installed in a mobile platform is an automotive "infotainment" system, in which video data can be generated by (or otherwise transmitted by) a control unit (e.g., a head-unit or other data source). The generated video data can be transferred to multiple display panels (e.g., a heads-up display, an instrument cluster, and a center-instrument display). To send different types of display data to different displays from a control unit, various cables/connectors are arranged between the control unit and each of the different displays. A cable adapted to convey signals between two units (such as a display and a control unit) has a first connector (e.g., a first set of connectors) adapted to connect to first mating connector(s) of a first unit, a second connector (e.g., a second set of connectors) adapted to connect to a second mating connector(s) of a second unit, and a cable harness (e.g., flexible cable harness) having insulated wiring arranged to electrically couple signals (e.g., unidirectional and/or bidirectional signals) between the first and second connectors.

In an example, multiple displays can be connected to the control unit in a one-to-many configuration with the connecting cables converging upon the control unit at a single location (e.g., a surface of the control unit). For example, a master control unit can include a connector and cable pair for communicating with each slave device of the system (e.g., in a star-network topology). The convergence of the connectors and cables at the control unit creates mechanical spacing issues in which the convergence of multiple connectors located side-by-side occupy significant space in an automobile vehicle. Further, video information (e.g., such as at least one video stream) from a control unit is high-resolution data that is streamed continuously to respective displays via a respective connector/cable pair. Because of the point-to-point connections of the star topology, each video stream need not be associated with networking addresses or be otherwise identified. Conventionally, video data from a head unit that is being transferred to displays is high resolution data being streamed continuously and is not in a format that can be readily networked, as in some other data-networking applications.

As described herein, an example system is adapted to selectively forward communications between serially chained devices of the example system. For example, the example system can include a control unit coupled to a serial chain (e.g., one end of a serial chain) of display units. An example multistream generator can be coupled to an output of the control unit, so that the example multistream generator can encode (e.g., encapsulate) video data from multiple streams into a format adaptable to different types of displays in the serial chain (e.g., daisy-chained displays). The mechanical spacing issues of congestion due to cable/connector convergence at a control unit location can be alleviated by arranging the example system components as shown in FIG. 1.

FIG. 1 is a system diagram showing an example vehicle that includes an example system adapted to selectively forward communications between serially chained devices of the example system. Generally described, the system 100 is an example system that includes a host vehicle 110. An example multiple display system 120 can be installed in the host vehicle 110. The example multiple display system 120 can include any number of displays in a serial chain, one end of which can be connected to a control unit.

An example multiple display system 120 can include a control unit (e.g., head unit 122), a first display (e.g., instrument cluster display CLUSTER 124), a second display (e.g., heads-up display HUD 126), and a third display (e.g., center-instrument display CID 128). The example multiple display system can include one or more head units 122. A head unit 122 is adapted to receive sensor data (e.g., from cameras or instrumentation sensors) and generate video streams in response to the sensor data. Each head unit 122 transmits at least one generated video stream, each of which is received by the multistream generator 123. However, the use of multiple head units increases system complexity, creates additional nodes of failure, increases costs, and occupies more space, for example, in confined areas.

The multistream generator 123 (MG) can have an input (e.g., video input) coupled to (e.g., can be included by) the head unit 122 and can have an output coupled (e.g., via cable 133) to an input of the stream disaggregator 125. In an example, the multistream generator 123 can receive a video stream from a respective head unit 122. In some examples, the multistream generator 123 can receive a video stream from at least one head unit 122 (e.g., so that one or more video streams can be generated by a head unit 122 for stream aggregation by the multistream generator 123).

The stream disaggregator 125 can have a first output (e.g., local output) coupled to (e.g., can be included by) the display CLUSTER 124) and can have a second output (e.g., system output) coupled (e.g., via cable 135) to an input of the stream disaggregator 127.

The stream disaggregator 127 can have a first output (e.g., local output) coupled to (e.g., can be included by) the display HUD 126) and can have a second output (e.g., system output) coupled (e.g., via cable 137) to an input of the stream disaggregator 129.

The stream disaggregator 129 (SD) can have a first output (e.g., local output) coupled to (e.g., that can be included by) the display CID 128) and can have a second output (e.g., system output) optionally coupled (e.g., via another cable, not shown) to an input of an optional stream disaggregator (not shown) for display. Other stream disaggregators can be successively concatenated to the tail of the serial chain connecting the serially chained displays (e.g., where the tail of the serial chain is opposite to the end of the serial chain connected to the head unit 122). (An example cabling network is described hereinbelow with respect to FIG. 4.)

As compared against a star-topology display system for three displays (which includes three cables and respective connectors converging at a location of the control unit), the serially chained display system described herein alleviates space and mechanical constraints, (e.g., so that the constraints are reduced to the space of having a solitary connector/cable connected at the head unit 122).

The multistream generator 123 is arranged to encode high-resolution, real-time video data (including video-associated data) into a packet format. Operation of a multistream generator is described hereinbelow with reference to FIG. 3. The multistream generator 123 can be arranged as a serializer (e.g., which is adapted to serially output video data, where the video data can be received asynchronously by the multistream generator 123 in a serial or parallel format) and/or can be arranged to output the video data in a parallel manner. Each packet can include an identifier (e.g., stream identifier) for identifying a particular video stream being encoded and/or for identifying a destination of the packet (e.g., identifying the display to which the packet is addressed). The identifier can be parsed by a stream disaggregator in accordance with a mode (e.g., a default or programmed configuration) associated with a respective stream disaggregator. Each packet is received by at least one stream disaggregator for forwarding (and/or decoding/deserializing).

A stream disaggregator (e.g., 133, 135, and 137) is arranged to receive the packet (e.g., which has an identifier for indicating a destination display) and to select between a stream disaggregator first output (e.g., a local output for coupling information to a locally coupled display) and a stream disaggregator second output (e.g., a system output for forwarding information to at least one other stream disaggregator).

Figure 2:
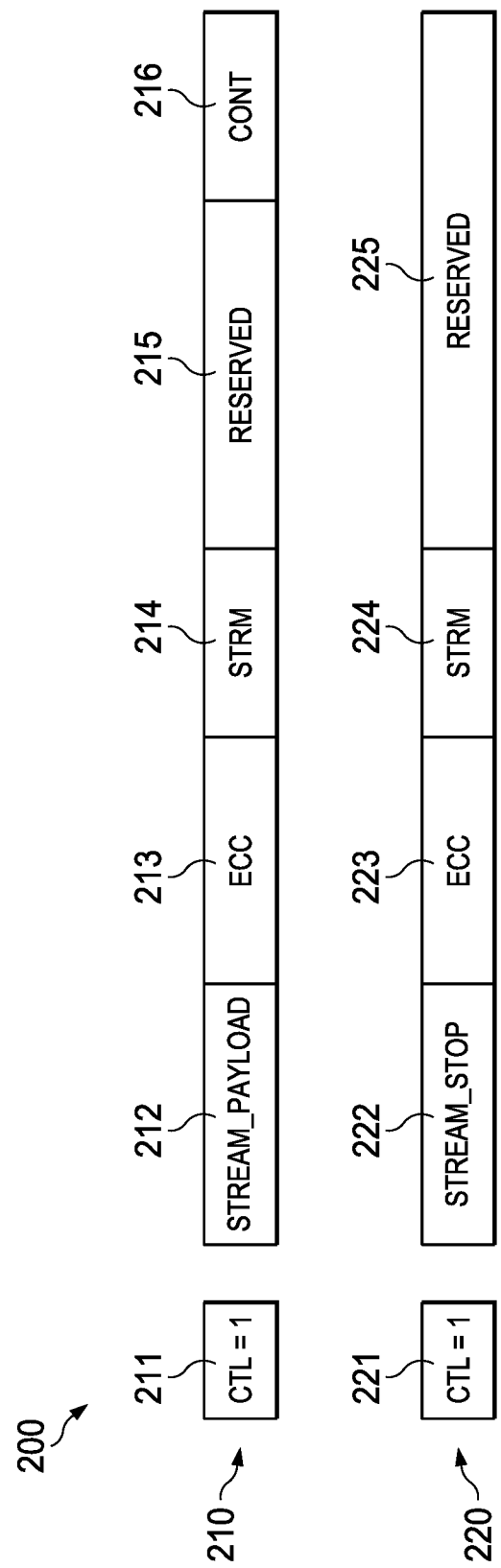
FIG. 2 is a diagram of example transmissions in an example system adapted to selectively forward communications between serially chained devices.

FIG. 2 is a diagram of example transmissions in an example system adapted to selectively forward communications between serially chained devices. Generally described, the transmissions 200 are example transmissions that are arranged in a packet format. The example transmissions can include streaming data for streaming video. The streaming video data can include audio data coupled to (e.g., synchronized with) the streaming video. The streaming data can include content for displaying moving and/or stationary images.

In a first example packet (such as packet 210), the packet 210 includes a control (CTL) field 211, a payload (e.g., STREAM PAYLOAD) field 212, an error-correction code (ECC) field 213, a stream/destination (STRM) field 214, a reserved field 215, and a continuation (CONT) field 216.

The field 211 can indicate whether the stream payload (e.g., field 212) includes command data or streaming data. Command data included by the field 212 can include: a start command, for example, for starting a playing of a selected video stream; a configuration command, for example, for configuring modes, selecting a particular protocol (e.g., from amongst various proprietary or industry standards) by which a particular stream disaggregator communicates with a connected local display (e.g., directed cabled local display), setting a playback channel for a particular display (e.g., for playing at least one selected stream that includes a selected STRM field 214 value); a routing command for selecting at least one stream to be routed to a local display (e.g., of a particular stream disaggregator); and/or a forwarding command for selecting at least one stream to be forwarded to another stream disaggregator (e.g., so that a first disaggregator forwards a selected stream to a second stream disaggregator that is downstream from the first stream disaggregator and a head unit). In an example, configuration data can be preprogrammed (e.g., at system integration, such as at a car factory) into a particular stream disaggregator (e.g., so that configuration time is reduced) and command data can be used in operation to reprogram a given configuration (e.g., whether the given configuration is preprogrammed or programmed in operation).

Streaming data included by the field 212 can include video (e.g., still or moving video) information, audio information, or combinations thereof. The resolution of the streaming data can be selected to provide a video (and/or sound) quality commensurate with a particular display and/or target functionality. Streamed video data can include pixel information. An example pixel can include 8 bits of red information, 8 bits of green information, and 8 bits of blue information. The numbers of rows and columns of pixels can be selected to generate a video frame that corresponds to the capabilities of a particular display screen. A video frame can be encoded as transmission symbols and/or as compressed information for transmission and subsequent decoding by a target display. The video frames can be streamed (e.g., transmitted as a temporal sequence of video frames associated with a particular video "feed").

The field 213 includes an ECC code (e.g., for error detection and correction). The number of the bits of field 213 can be increased (e.g., from a one-bit parity bit to larger numbers of bits) to provide increasing levels of detection—and even correction—of errors that can occur in the packet 210 that is being transmitted and received. A receiver can evaluate the ECC code of a received packet against other bits of the received packet, for example, to correct a corrupted packet and/or request (e.g., by transmitting upstream) a retransmission of the original packet (e.g., the original packet data). The length of the ECC field can be selected to provide a level of performance for a particular functionality (e.g., for dashboard displays as compared against a less-critical infotainment display unit for viewing by a back-seat passenger).

The field 214 includes information that helps identify the display to which a received packet is to be routed. The number of bits in the field 214 is sufficient to uniquely identify a particular stream (e.g., video channel) and/or display (e.g., at least one display for consuming and playing back a stream associated with the received packet). In a first example: the field 214 includes sufficient bits to identify a particular stream (e.g., a channel number), where the stream disaggregators are programmed (e.g., via the herein-described configuration commands) to route the received packet to at least one display (e.g., that is set to the channel number, so that more than one display can playback the same stream). In a second example: the field 214 includes sufficient bits to identify a particular display (e.g., an instrument panel or an electronic side-view "mirror" display) upon which the particular received packet is to be displayed. In a third example: the field 214 includes sufficient bits to indicate a code for selecting a predefined routing configuration for consuming (e.g., routing to a local display) and/or forwarding the particular received packet. In a fourth example, the field 214 includes sufficient bits to include combinations (e.g., some or all combinations) of the functionality described herein for the first, second, and third examples.

The field 215 is reserved for conveying data for an undefined (e.g., unpublished or not-yet published) purpose. For example, a reserved field does not necessarily carry useful data in an earlier system but could be used to convey useful information in a later system, so that the packet length need not be changed to make room for carrying the later-implemented information. The field 215 can include sufficient bits to extensibly transmit and receive for packets having a common packet length (e.g., in accordance with a follow-on protocol standard related to at least one existing FPD standard or in accordance with a later-developed proprietary protocol).

The field 216 indicates whether the packet is the last packet in a stream. In an example where the field 216 indicates the last packet in a steam, a display consuming the packet can take an action in response to the indication that the particular received packet is the last packet in a stream. An example action (e.g., that is taken in response to the indication that the particular received packet is the last packet in a stream) can be a provisional action (e.g., a quickly reversible action) such as dimming a display selected to display a stream associated with the particular received packet. Packet transmission and forwarding is described hereinbelow with reference to FIG. 4.

In a second example packet (such as packet 220), the packet 220 includes a control (CTL) field 221, a stop (e.g., STREAM STOP) field 222, an error-correction code (ECC) field 223, a stream/destination (STRM) field 224, and a reserved field 225.

The field 221 can indicate whether the stream payload includes command data (such as a stop command of field 222). Command data included by the field 222 can include the stop command. In response to a transmitted stop command, downstream stream disaggregator(s) and display(s) identified by the field 224 can power-down, reinitialize, and/or reallocate resources previously allocated for displaying the stream associated with the received packet (e.g., the packet that includes the stop command). In an example, the field 222 can include commands for terminating operation of programmable hardware adapted to display video information (e.g., a code in the stop field 222 can indicate the instant packet is the last packet in a video stream indicated by the field 224).

The field 223 includes an ECC code (e.g., for error detection and correction) such as a code include by the field 213.

The field 224 is a field similar to field 214 and can include information for indicating which stream is associated with the packet and/or for indicating the display to which the packet is to be sent.

The field 225 is a field similar to field 215. A continuation field, such as field 216, need not be implemented in a packet that include a stop field because the presence of a stop field can be used to determine that a packet that includes a stop field is the last packet in the stream. Using the stop field to infer that the stream is to be terminated frees the space otherwise used by the continuation field in a packet having a stop field to be reserved for a potential future use (e.g., a future use for an arbitrary purpose).

Figure 3:
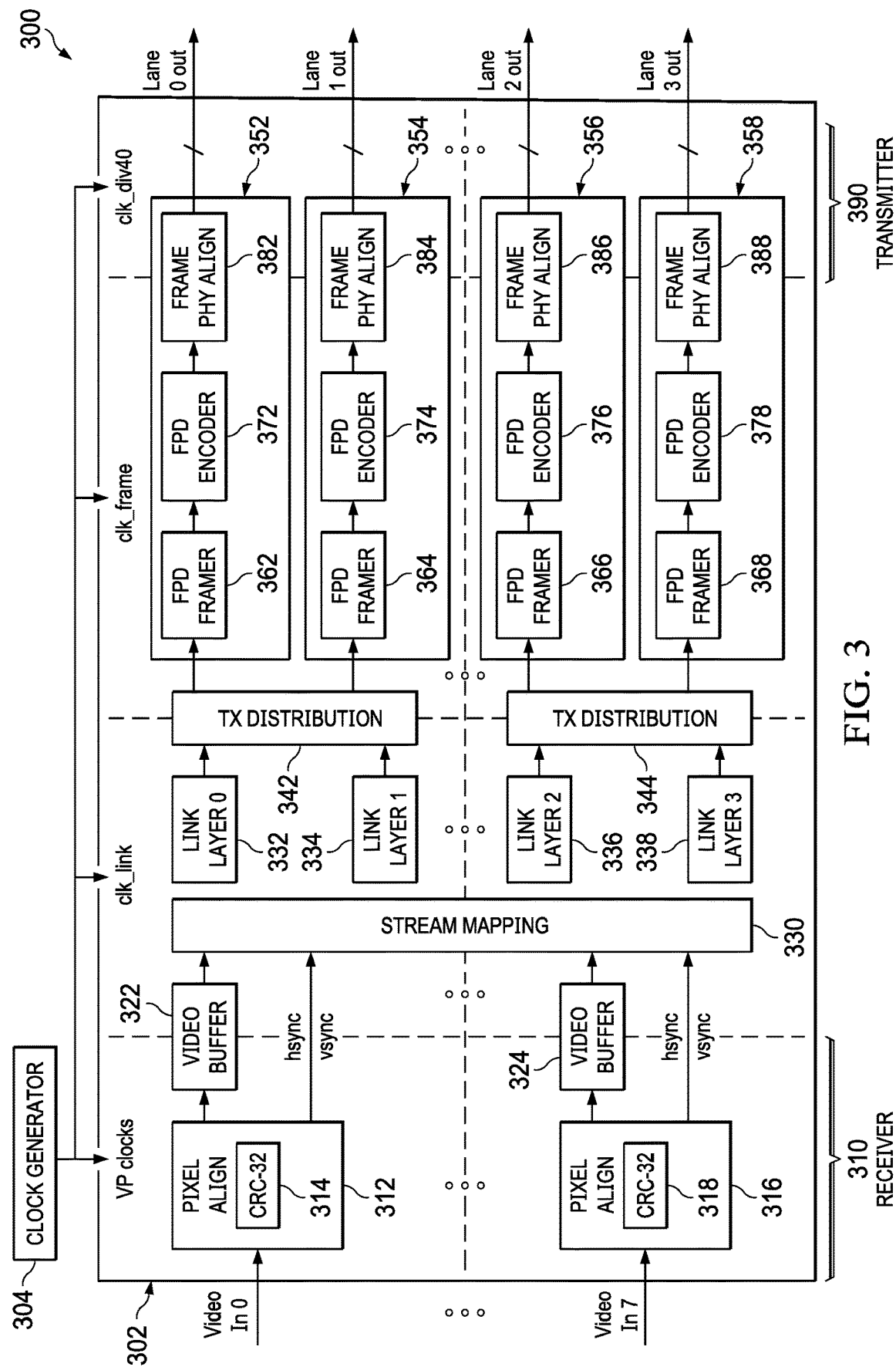
FIG. 3 is a block diagram of an example multistream generator adapted to aggregate input streams in an example system adapted to selectively forward communications between serially chained devices.

FIG. 3 is a block diagram of an example multistream generator adapted to aggregate input streams in an example system that is adapted to selectively forward communications between serially chained devices. The multistream generator 300 is an example multistream generator that can be arranged on a substrate 302. The multistream generator 300 includes an input (e.g., a receiver 310) that is adapted to receive at least one video stream from a selected head unit and an output (e.g., a transmitter 390) that is adapted to forward packetized video stream(s) to a first stream disaggregator. The packetized video streams can be generated (e.g., sourced) by a video source (such as a digital camera) in accordance with a MIPI (mobile industry peripheral interface) camera serial interface (CSI). The video sources for generating the example video 0 through video 7 streams can include sensors (e.g., sensors 402), which can include various cameras such as backup or side-view cameras, where each camera can be arranged to generate a respective video stream. The video sources for generating the example video 0 through video 7 streams can also include the head unit (e.g., head unit 401) itself, which can generate, in response to sensors such as sensors 402, at least one video stream for display (as described hereinbelow with respect to FIG. 4).

In one example, the clock generator 304 is arranged on the substrate 302 and is adapted to generate clock signals such as video pixel clocks (VP clocks), video link layer clocks (vclk_link), frame clocks (clk_frame), and lane clocks (clk_div40). In some examples, some of the clock signals can be generated by circuitry not included on the substrate 302. Moreover, the architecture of the multistream generator is scalable (e.g., by powers of two), so that the multistream generator can aggregate a selected number (e.g., eight or more) of video streams (which can be addressed by including a sufficient number of bits in field 214 and field 224). In some examples, the receiver can include a transmitter, so that information can be transmitted (e.g., in a second, opposite direction) from an example receiver 310. The multistream generator 300 can be adapted transfer data bidirectionally (e.g., at 165 megabits per second upstream or at 13 gigabits per second downstream), where an example of bidirectional transmission/reception of transferred data is described in U.S. Pat. No. 9,363,067, issued Jun. 7, 2016, entitled Data signal transceiver circuitry for providing simultaneous bi-directional communication via a common conductor pair, the entirety of which is incorporated herein by reference.

For a first video stream (e.g., Video In 0) in the example multistream generator 300, a pixel aligner 312 is adapted to sample a first video transmission, to align (e.g., synchronize) the sampled data with an internal clock (e.g., a VP clock) of the multistream generator 300, and to generate horizontal synchronization (hsync) and vertical synchronization (vsync) information (e.g., for identifying pixel location of received pixel data). The sampled data is validated by checking for errors (and correcting, if possible) by 32-bit cyclical redundancy checker (CRC) 314. The validated information is stored in the video buffer 322 and is temporally associated with hsync and vsync information, so that, for example, start and stop packets can be respectively associated with the beginning and the end of a video frame to be displayed. The video stream can be received (e.g., from a head unit) as a serial or parallel stream, accessed from system memory (e.g., frame memory), and/or transmitted/accessed by combinations thereof.

The stream mapper 330 is adapted to receive stream (e.g., Video In 0 stream) information from the video buffer 322 and the associated hsync and vsync signals. In response to the video buffer 322 information and the associated hsync and vsync signals, the stream mapper 330 is configured to associate a particular video stream with a particular display (e.g., by setting the value of a STRM field such as field 214 or field 224).

The lane-0 link layer 332 is arranged to generate signals (for example) adapted to control physical layer parameters for transmitting data on lane-0 in accordance with a system protocol (e.g., FPD protocol, which is described hereinbelow). The lane-1 link layer 334 is arranged to generate link control signals (for example) adapted to control physical layer parameters for transmitting data across lane-1 in accordance with a system protocol. The link control signals can be generated in synchronization with (e.g., in response to) the video link layer clocks.

Packets from a particular stream (e.g., Video In 0 stream) can be transmitted across either lane-0 or lane-1 in response to an assignment made by the transmission distributor (TX distributor) 342. The TX distributor 342 can allocate at least one transmission lane, so that pixels of a video frame can be transmitted at a rate sufficient to fulfill frame rates of the display indicated by the STRM field. A first output of the TX distributor 342 is coupled to transfer lane-0 data to an input of the framer 352, and a second output of the TX distributor 342 is coupled to transfer lane-1 data to an input of the framer 354. The pixels of a video frame can be transmitted in synchronization with a frame clock. In some examples, a particular lane can be associated with a respective display (e.g., as a system design choice), so that a video stream can be associated with (e.g., forwarded to) a respective display. In some examples, lanes can be dynamically assigned on the basis of network traffic, so that a lane can carry different video streams (e.g., where a stream disaggregator is adapted to associate received packets of a particular video stream with a particular display and, in response, to forward/transmit packets of a given video stream towards the correct display).

The framer 352 and framer 354 are adapted to generate transmission frames in accordance with a system protocol, such as a low-voltage differential-signaling (LVDS) protocol. The system protocol can be an LVDS standard, such as a flat-panel display link (FPD) protocol (e.g., FPD-Link I, FPD-Link II, FPD-Link III, and any follow-on standard related to at least one existing FPD standard). The system protocol can also include a "sub-LVDS standard," current-mode and/or voltage mode drivers/receivers, and other such low power, high-speed signaling protocols (including a gigabit multimedia serial link—GMSL). The FPD framer 362 is adapted to align data for transmission within a transmission frame, the FPD encoder 372 is adapted to encode the aligned data as symbols for transmission within the transmission frame, and the FPD frame physical aligner (FRAME PHY ALIGN) 382 is adapted to buffer the encoded symbols for synchronous transmission (e.g., as clocked by a lane clock) by transmitter 390 across lane-0. The FPD framer 364 is adapted to align data for transmission within a transmission frame, the FPD encoder 374 is adapted to encode the aligned data as symbols for transmission within the transmission frame, and the FPD frame physical aligner (FRAME PHY ALIGN) 384 is adapted to buffer the encoded symbols for synchronous transmission by transmitter 390 across lane-1. The encoded symbols can be decoded, for example as described hereinbelow, by a receiver such as receiver 422 and encoded by a stream forwarder (e.g., stream transmitter) such as stream forwarder 426.

For a second video stream (e.g., Video In 7) in the example multistream generator 300, a pixel aligner 316 is adapted to sample a video transmission, to align the sampled data with an internal clock of the multistream generator 300, and to generate horizontal synchronization (hsync) and vertical synchronization (vsync) information. The sampled data is validated by checking for errors by 32-bit cyclical redundancy checker (CRC) 318. The validated information is stored in the video buffer 324 and is temporally associated with hsync and vsync information, so that, for example, start and stop packets can be respectively associated with the beginning and the end of a video frame to be displayed.

The stream mapper 330 is adapted to receive stream (e.g., Video In 7 stream) information from the video buffer 324 and the associated hsync and vsync signals. In response to the video buffer 324 information and the associated hsync and vsync signals, the stream mapper 330 is configured to associate a particular video stream with a particular display (e.g., by setting the value of a STRM field such as field 214 or field 224).

The lane-2 link layer 336 is arranged to generate signals (for example) adapted to control physical layer parameters for transmitting data on lane-2 in accordance with a system protocol. The lane-3 link layer 338 is arranged to generate signals (for example) adapted to control physical layer parameters for transmitting data across lane-3 in accordance with a system protocol.

Packets from a particular stream (e.g., Video In 7 stream) can be transmitted across either lane-2 or lane-3 in response to an assignment made by the transmission distributor (TX distributor) 344. The TX distributor 344 can allocate at least one transmission lane, so that pixels can be transmitted at a rate sufficient to fulfill frame rates of the display indicated by the STRM field. A first output of the TX distributor 344 is coupled to transfer lane-2 data to an input of the framer 356, and a second output of the TX distributor 344 is coupled to transfer lane-1 data to an input of the framer 358.

The framer 356 and framer 358 are adapted to generate transmission frames in accordance with a system protocol, such as a low-voltage differential-signaling (LVDS) protocol. The system protocol can be an LVDS standard, such as the fourth revision of the flat-panel display link (FPD) protocol. The FPD framer 366 is adapted to align data for transmission within a transmission frame, the FPD encoder 376 is adapted to encode the aligned data as symbols for transmission within the transmission frame, and the FPD frame physical aligner (FRAME PHY ALIGN) 386 is adapted to buffer the encoded symbols for synchronous transmission by transmitter 390 across lane-2. The FPD framer 368 is adapted to align data for transmission within a transmission frame, the FPD encoder 378 is adapted to encode the aligned data as symbols for transmission within the transmission frame, and the FPD frame physical aligner (FRAME PHY ALIGN) 388 is adapted to buffer the encoded symbols for synchronous transmission by transmitter 390 across lane-3.

Other video inputs (e.g., Video In 2 through Video In 6) and lane outputs (e.g., Lane-4 through Lane-15) and circuitry can be included, so that system bandwidth is sufficient to handle (for example) larger numbers of displays (e.g., for instrumentation, side and rear views, navigation, and infotainment systems for passengers) and/or increased resolutions. As described hereinbelow with reference to FIG. 4, the output (e.g., multistream output) is coupled to at least one stream disaggregator for coupling a selected video stream to the respective local display. A local display need not be coupled to any stream disaggregator, although cabling requirements (e.g., numbers of connectors, cables, and/or conductors) in systems with multiple displays and video streams are increased for cabling a local display not coupled to a stream disaggregator.

Figure 4:
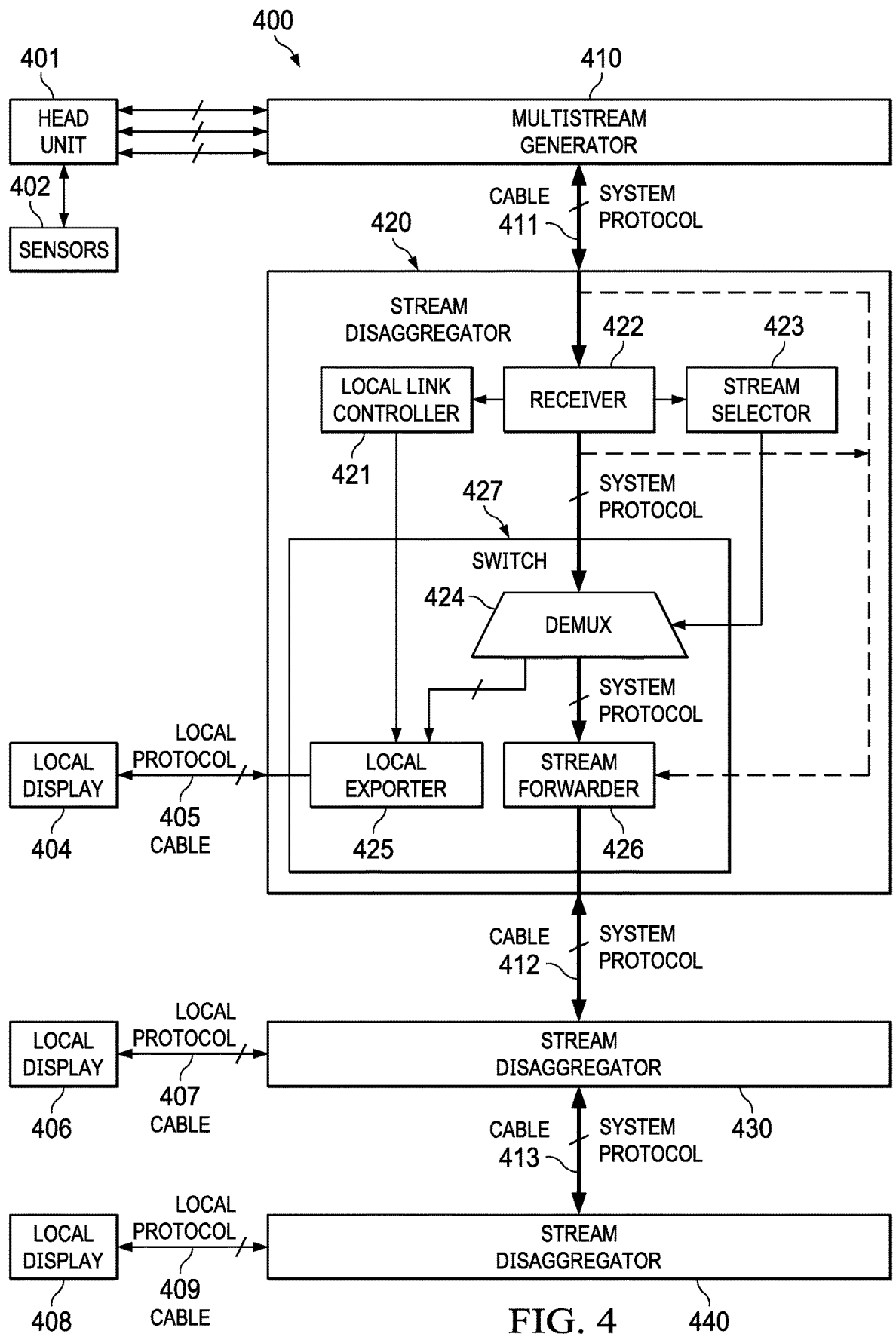
FIG. 4 is a block diagram of an example system that includes at least one stream disaggregator adapted to selectively forward communications between serially chained devices.

FIG. 4 is a block diagram of an example system that includes at least one stream disaggregator adapted to selectively forward communications between serially chained devices. For example, the system 400 is an example system that includes a head unit 401, a multistream generator 410, a stream disaggregator 420 (e.g., coupled locally to local display 404 via cable 405), a stream disaggregator 430 (e.g., coupled locally to local display 406 via cable 407), and a stream disaggregator 440 (e.g., coupled locally to local display 408 via cable 409). The stream disaggregators 420, 430, and 440 can be adapted transfer data bidirectionally (e.g., at 165 megabits per second upstream or at 13 gigabits per second downstream).

In an example, the head unit 401 is coupled to receive sensor information from sensors 402. The sensors 402 can be a suite of sensors associated with electronic systems of a vehicle (e.g., vehicle 110). Such sensors can include sensors adapted to sense positions of driver controls (e.g., gear shift, lights, steering wheel, turn signal lever, and other controls), vehicle attributes (e.g., speed, gas level, temperature, fuel flow, tire pressure, seat belts, and other attributes), and positioning (e.g., radar, satellite navigation, cameras, lane and curb sensors, and other relational information). The head unit 401 is adapted to generate output information (e.g., video information) in response to the sensor information. Additional head units 401 can be coupled various sensors 402 and the multistream generator 410.

The head unit 401 is adapted to generate video information for display on the local display 404 (e.g., which can be a CLUSTER 124), the local display 406 (e.g., which can be a heads-up display HUD 126), and the local display 408 (e.g., which can be a center-instrument display CID 128). For example, the head unit can generate: a first video stream of a vehicle dashboard in operation (e.g., for display on a display panel for replacing mechanical gauges); a second video stream for a HUD (e.g., to display navigation information on a virtual screen on a windshield); and a third video stream for a CID (e.g., to display real-time images from a rearward-facing backup camera). The head unit 401 is adapted to output the video streams as individual bit streams, for example.

The multistream generator 410 is a multistream generator such as the multistream generator 300, described hereinabove. The multistream generator 410 is coupled to the video outputs (e.g., each of the video outputs) of the head unit 401 and is adapted to combine independent video streams (e.g., of at least two) of the video streams received from the head unit 401 into a unified (e.g., multistream) video stream using a system protocol. The multistream generator is adapted to packetize information from the unified video stream (which includes information of at least two video streams, for example) and to transmit the unified video stream (multi stream). Accordingly, the multistream generator is arranged as a source node of the unified video stream.

The individual packets (generated by the multistream generator) each include an identification field, such as a STRM identifier that can identify a selected display (e.g., addressed display and/or addressed node) as the destination of the packet. The multistream generator 410 is adapted to couple the encoded packets to a source output (e.g., of a source node) of the multistream generator 410. A first cable (411) is connected between the multistream generator 410 (e.g., source node) and a first stream disaggregator (e.g., stream disaggregator 420). The first cable includes conductors (and associated insulators/shielding) sufficient to carry information for all lanes (e.g., at least one lane) over which video information is transmitted.

The stream disaggregator 420 includes a local link controller 421, a stream input (such as receiver 422), a stream selector 423, a demultiplexer (DEMUX) 424, and a switch 427 (which includes a local exporter 425 and a stream forwarder 426). The receiver 422 can comprise a physical layer receiver, the local exporter 425 can comprise a physical layer driver, and the stream forwarder 426 can comprise a physical layer driver. The receiver 422 has a receiver output. The receiver 422 has a receiver input adapted to receive input data (e.g., the unified video stream) from an output of a source node (e.g., the multistream generator 410). The input data can be (and/or include) an incoming packet that includes an identification field, wherein the incoming packet is transmitted by the source node. The input data can be received as serial or parallel data. The input data is received in accordance with a system protocol (e.g., an FPD protocol) that is different from the local protocol (e.g., an eDP protocol, described hereinbelow).

The stream selector 423 includes a selector output. The stream selector 423 is coupled to a receiver output (e.g., of the receiver 422), and the stream selector 423 is configured to generate a destination indication at the selector output (e.g., of the stream selector 423). For example, the stream selector 423 is adapted to monitor the receiver 422 for received transmissions (e.g., packet 210 and packet 220) for STRM field contents (e.g., which can include functional data) and to program the demultiplexer (DEMUX) 424 in response. In an example, the stream selector 423 is adapted to generate the destination indication in response to the identification field (the stream selector 423 is optionally adapted to receive an identification field.

The switch 427 includes a switch local output and a switch system output. The switch 427 is coupled to the output of the receiver 422 (or optionally coupled to the input of the receiver 422) and is adapted to generate a transmission (e.g., output signal) at the switch local output (e.g., a first output of the switch) in response to an indication of the stream selector 423 output and the input data, and is adapted to generate a transmission at the switch system output in response to the input data. The switch local output is adapted to be coupled to a first destination node, and the switch system output is adapted to be coupled to a second destination node. For example, the switch 427 is adapted to generate, in response to the identification field, an output packet adapted to be transmitted at the switch local output (e.g., the local exporter 425) when, for example, the identification field indicates that the packet is to be exported to the local display 404. In one example, the switch 427 is adapted to route, in response to the destination indication, the input data to the switch system output (e.g., the stream forwarder 426) when, for example, the destination indication at the output of the stream selector 423 indicates that the packet is to be forwarded to another display (e.g., that the packet is not to be exported to the local display 404). In another example, the switch 427 forwards (e.g., transmits) all input data received by the stream disaggregator 420, where the input data is coupled from the receiver input 422 (where the coupling can include coupling the input data through the receiver 422 itself and the receiver 422 output), so that a transmission at the switch system output is generated by the switch 427 in response to the input data (e.g., irrespective of the stream field 214 and 224 contents).

The demultiplexer 424 includes a first output that is adapted to be coupled to a first destination node, and the demultiplexer 424 includes a second output that is adapted to be coupled to a second destination node. For example, the demultiplexer 424 includes a first output that is adapted to be coupled via the local exporter 425 to the local display 404. The first destination node is a local (e.g., local to the stream disaggregator 420 instance) node address that can be associated with at least one display node address. In the example, the demultiplexer 424 includes a second output that is adapted to be coupled via the stream forwarder 426, the cable 412, and the stream disaggregator 430 to the local display 406 (for example). The second destination node is a nonlocal node address can be associated with a display node address that indicates a node address other than a node address associated with the first destination node. The node addresses can be logical addresses of the various display nodes, whereas the stream field contents identify a particular video stream (which, for example, can be received selectively received by one or more displays having different logical addresses). A stream selector can be dynamically programmed (e.g., in response to a received control packet) to direct a selected video stream to the local display associated with the stream selector. The stream forwarder 426 is coupled to the switch system output, and the stream forwarder is adapted to transmit in accordance with the system protocol.

In an example, the demultiplexer 424 is adapted to couple (e.g., by switching), in response to the destination indication, the incoming packet to the first output of the switch and the second output of the switch. In an example, the demultiplexer 424 is adapted to generate, in response to the identification field, a packet at a selected one of the at least the first output of the switch and the second output of the switch. In an example, the demultiplexer 424 is adapted to generate a packet destination indication in response to an identification field of the incoming packet.

The local link controller is a local controller coupled to the switch local output, wherein the switch local output is adapted for transmitting to a display. The local link controller 421 is adapted to monitor the transmissions (e.g., packet 210 and packet 220) received by the receiver 422 for commands (e.g., functional data). The local link controller 421 is adapted to control a transmission of packets from the switch local output in accordance with a local protocol (e.g., which is a protocol that is different from the system protocol).

The local exporter 425 is coupled to the first output of the demultiplexer 424, wherein the local exporter 425 includes an exporter output adapted for coupling to a display. For example, the first output of the demultiplexer 424 is coupled to an input of the local exporter 425. An exporter output of the local exporter 425 can be coupled (e.g., connected) to the local display 404.

The output of the local exporter 425 includes a local protocol. In an example, the local protocol is a display port protocol such as the Video Electronics Association of America (VESA) embedded DisplayPort (eDP) standard. Accordingly, the input data can be received by the receiver 422 in accordance with a system protocol (e.g., FPD) that is different from at least one local protocol. Other display port protocols that can be supported as local protocols include: the DisplayPort (DP); the open liquid crystal display interface (OpenLDI); and the mobile industry processor interface (MIPI) display serial interface (DSI) and camera serial interface (CSI). A first local protocol (e.g., 405) of a first display (e.g., 404) can be a different protocol from a second local protocol (e.g., 407) of a second display (e.g., 406).

The stream disaggregator 420 can be programmed to operate in accordance with a protocol associated with the particular display locally coupled to the local exporter 425. For example, the multistream generator 410 can configure the stream disaggregator 420 by transmitting a start command to the local link controller 421 that includes an indication of the selected protocol. The indication of the selected protocol can be included within a stream payload 212, for example. In an example system, a first stream disaggregator (e.g., 420) is adapted to select a first local protocol (e.g., 405) and a second stream disaggregator (e.g., 430) is adapted to select a second local protocol that is a different protocol from the first local protocol.

In an example system with two displays, a first cable (e.g. 411) is coupled between the output of the multistream generator 410 and the input of the first stream disaggregator 420, and a second cable (e.g., 412) is coupled between the second output of the first stream disaggregator 420 and the input of the second stream disaggregator 430. In the example system with two displays, received packets (e.g., encoded packets) of a first video stream are transmitted across the first cable (e.g., via a first switch local output) to the first display, and received packets (e.g., encoded packets) of a second video stream are transmitted across the first cable and the second cable (e.g., via a first switch system output and a second switch local output) to the second display.

In an example with at least two displays, the stream disaggregator 430 can include: a second receiver having a second receiver output, and having a second receiver input adapted to receive second input data from the first switch local output; a second selector having a second selector output, wherein the second selector is coupled to the second receiver, and wherein the second selector is configured to generate a second destination indication at the second selector output; and a second switch having a second switch local output and a second switch system output, wherein the second switch is coupled to the second receiver, and wherein the second switch is adapted to generate a transmission at the second switch local output in response to an indication of the second selector output and the second input data, wherein the second switch is adapted to generate a transmission at the second switch system output in response to the second input data.

In the example system with at least two displays, the stream disaggregator 430 can further include: comprising a second local controller coupled to the second switch local output, wherein the second switch local output is adapted for transmitting to a second display, and wherein the second local exporter is arranged to transmit data to the second display in response to a start command of a packet that includes the second destination indication as indicating the second display.

In another example system with at least two displays: a head unit is adapted to generate at least two video streams at an output of the head unit; and a multistream generator is coupled to the output of the head unit and is adapted to generate encoded packets that include information from the at least two video streams and to transmit the encoded packets to the source output, wherein the input data includes a packet from one of the at least two video streams. The encoded packets can be encoded by an encoder such as FPD encoder 372, 374, 376, and 378, and the encoded packets can be decoded by a receiver (e.g., receiver 422 of a downstream stream disaggregator, for example).

In an example system with at least two displays, the system includes: a head unit adapted to generate at least two video streams; a multistream generator coupled to the head unit, and adapted to generate encoded packets that comprise an identification field and that include information from the at least two video streams, and to couple the encoded packets to an output of the multistream generator; a first stream disaggregator having a first stream input coupled to the output of the multistream generator, the first stream disaggregator having a first output adapted to couple in accordance with a first local protocol a received encoded packet to a first display in response to an identification field of the received encoded packet indicating a node address of the first display, and the first stream disaggregator having a second output adapted to forward the received encoded packet in response to the identification field of the received encoded packet indicating a node address of other than a first display; and a second stream disaggregator having a second stream input coupled to the second output of the first stream disaggregator, the second stream disaggregator having a first output adapted to couple in accordance with a second local protocol the received encoded packet to a second display in response to an identification field of the received encoded packet indicating a second display node, and the second stream disaggregator having a second output adapted to forward the received encoded packet in response to an identification field of the received encoded packet indicating a node address other than a second display node address. The example system can further comprise: a third stream disaggregator having a third stream input coupled to the second output of the second stream disaggregator, the third stream disaggregator having a first output adapted to couple the received encoded packet to a third display in response to an identification field of the received encoded packet indicating a third display node address, and the third stream disaggregator having a second output adapted to forward the received encoded packet in response to an identification field of the received encoded packet indicating a node address other than a third display node address. The example system can further comprise: a first cable coupled between the output of the multistream generator and the first stream input; and a second cable coupled between the second output of the first stream disaggregator and the second stream disaggregator, wherein encoded packets of a first video stream are transmitted across the first cable to the first display, and wherein encoded packets of a second video stream are transmitted across the first cable and the second cable to the second display. In the example system, the first local protocol can be a different protocol from the second local protocol.

An example method for networking a multiple display system can include operations such as: transmitting, to a first display in response to an identification field of the received encoded packet indicating a node address of the first display, a first transmission including information of a received encoded packet; forwarding, in response to the identification field of the received encoded packet indicating a node address other than a first display node address, a second transmission including information of the received encoded packet; transmitting, to a second display in response to an identification field of the received encoded packet indicating a second display, a third transmission including information of the received encoded packet; and forwarding, in response to an identification field of the received encoded packet indicating a node address other than a second display node address, a fourth transmission including information of the received encoded packet. When the received encoded packet is a first encoded packet, the example method can further include: generating the first encoded packet in response to information received from a first video stream, and generating a second encoded packet in response to information received from a second video stream; transmitting the first encoded packet of the first video stream across a first cable to the first display; and transmitting the second encoded packet of the second video stream across the first cable and a second cable to the second display. The example method can further include: generating the first video stream in response to sensors of a vehicle that includes the first and second displays.

In an example system with three displays, a first cable (e.g. 411) is coupled between the output of the multistream generator 410 and the input of the first stream disaggregator 420, a second cable (e.g., 412) is coupled between the second output of the first stream disaggregator 420 and the input of the second stream disaggregator 430, and a third cable (e.g., 413) is coupled between the second output of the second stream disaggregator 430 and the input of the third stream disaggregator 440. In the example system with three displays, received encoded packets of a first video stream are transmitted across the first cable (e.g., via a first switch local output) to the first display, received encoded packets of a second video stream are transmitted across the first cable and the second cable (e.g., via a first switch system output and a second switch local output) to the second display, and received encoded packets of a third video stream are transmitted across the first cable, the second cable, and the third cable (e.g., via a first switch system output, a second switch system output and a third switch local output) to the third display.

In accordance with the examples described herein, additional displays and video streams can be added to a multiple display unit without (for example) increasing the number of cables connected to (e.g., physically connected to) the head unit 401 and/or the multistream generator 410.

Figure 5:
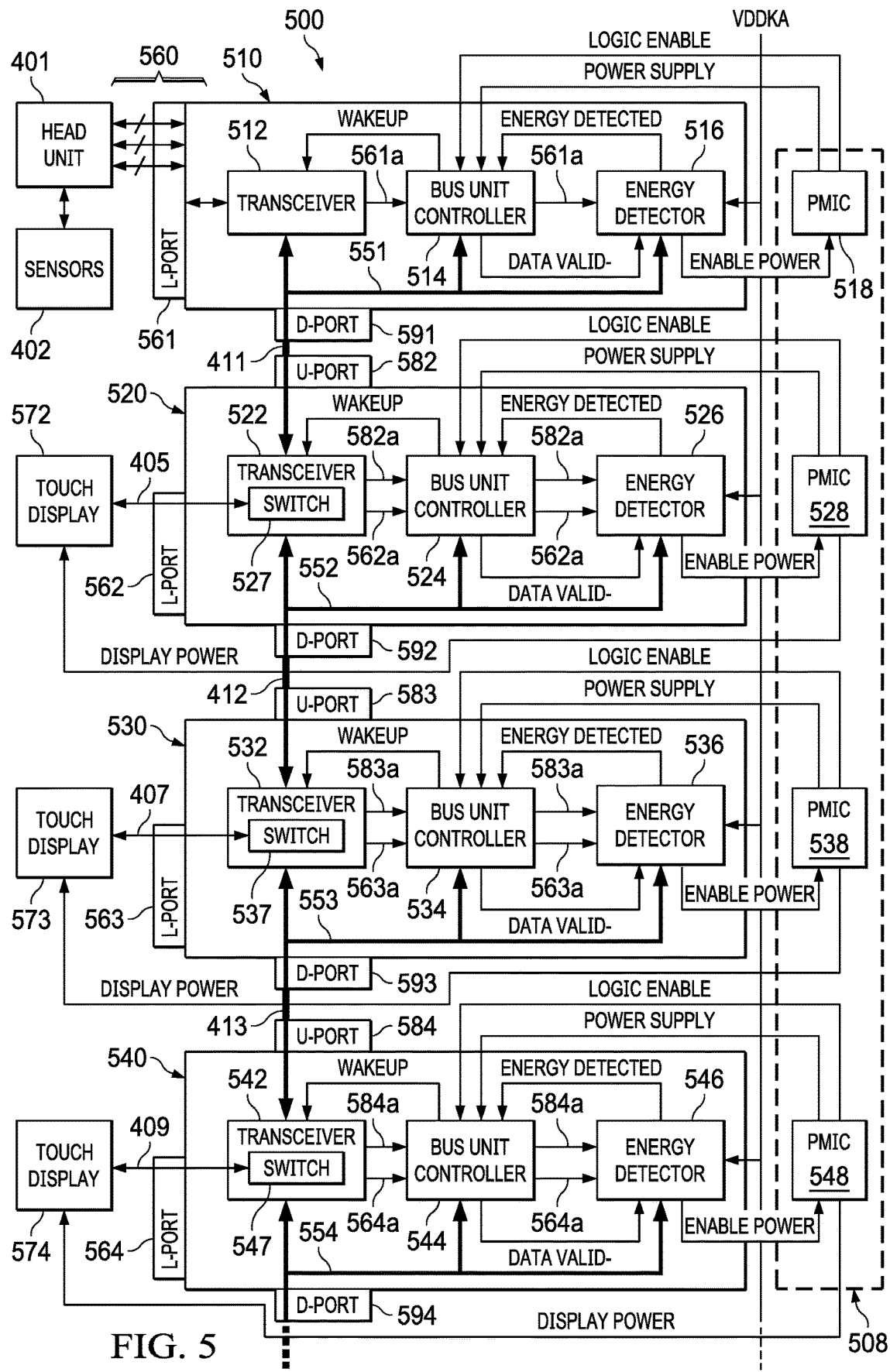
FIG. 5 is a block diagram of an example system that includes at least one bus unit adapted to generate and forward system wakeup signals between serially chained bus units.

FIG. 5 is a block diagram of an example system that includes at least one bus unit adapted to generate and forward system wakeup signals between serially chained bus units. For example, the system 500 is an example system that includes a head unit 401 (e.g., coupled to sensors 402), a first bus unit 510 (e.g., coupled locally to the head unit 401 via a local port 561 and cable(s) 560), a second bus unit 520 (e.g., coupled locally to the touch display 572 via a local port 562 and cable 405), a third bus unit 530 (e.g., coupled locally to the touch display 573 via a local port 563 and cable 407), and a fourth bus unit 540 (e.g., coupled locally to the touch display 574 via a local port 564 and cable 409). The bus units 510, 520, 530, and 540 can be adapted transfer data bidirectionally (e.g., at 165 megabits per second upstream or at 13 gigabits per second downstream). The bus units 520, 530, and 540 can be serializers and/or deserializers (e.g., SERDES) and/or disaggregators (such as 420, 430, and 440 respectively).

In an example wakeup sequence generally described herein following, the second bus unit 520 can be configured in an active mode (e.g., awakened) from a power conservation mode by a local wakeup signal generated in response to a wakeup event detected at the touch display 572. In response to the local wakeup signal, the second bus unit 520 can generate and transmit a system wakeup signal to the first bus unit 510 (e.g., so that the system wakeup signal is transmitted in an upstream direction and the first bus unit 510 is awakened in response). Similarly, the second bus unit 520 can generate and transmit a system wakeup signal to the third bus unit 530 (e.g., so that the system wakeup signal is transmitted in a downstream direction and the third bus unit 530 awakened in response). In the example, the third bus unit 530 in response to receiving a system wakeup signal can generate a subsequent wakeup signal and transmit the wakeup signal to the fourth bus unit 540 (e.g., so that the system wakeup signal is transmitted in a downstream direction and the third bus unit 530 awakened in response). Other wakeup sequences are described hereinbelow (e.g., with respect to FIG. 8, FIG. 9, and FIG. 10).

In a first example system, the system 500 includes a first bus unit (FBU) 510 having an FBU first system port (e.g., downstream D-port 591), an FBU local port (e.g., local L-port 561), an FBU wakeup input, an FBU transceiver 512, an FBU controller 514, and an FBU energy detector 516. The FBU transceiver 512 is coupled to the FBU first system port, the FBU local port and the FBU wakeup input.

The FBU first system port (e.g., 591) is adapted to receive an FBU first system input signal. The FBU local port (e.g., 561) is adapted to receive an FBU local input signal. The FBU transceiver 512 is configured to transfer data of the FBU first system input signal to the FBU local port (e.g., 561) in an FBU first mode (e.g., active mode). The FBU transceiver 512 is configured to conserve power in an FBU second mode. The FBU transceiver 512 is configured to enter the FBU first mode in response to an FBU local wakeup signal. The FBU transceiver 512 is configured to transmit an FBU system wakeup signal at one of the FBU first system port (e.g., 591) and the FBU local port (e.g., 561) in response to the FBU local wakeup signal.

The FBU controller 514 has an FBU energy detected input and an FBU wakeup output, the FBU wakeup output being coupled to the FBU wakeup input. The FBU controller 514 is configured to generate the FBU local wakeup signal at the FBU wakeup output in response to an FBU energy detected signal.

The FBU energy detector 516 has an FBU energy detected output coupled to the FBU energy detected input. The FBU energy detector 516 is coupled to the FBU first system port (e.g., via bus 551) and the FBU local port (e.g., via node 561a). The FBU energy detector 516 is configured to generate the FBU energy detected signal at the FBU energy detected output in response to an FBU detection of energy of one of the FBU first system input signal (e.g., via node 561a) and the FBU local input signal received by the FBU transceiver 512 in the FBU second mode.

In the first example system, the system 500 further includes a second bus unit (SBU) 520 having an SBU first system port (e.g., upstream U-port 582). The SBU first system port is coupled to the FBU first system port (e.g., downstream D-port 591). The SBU first system port (e.g., 582) is adapted to receive the FBU system wakeup signal and the FBU first system port (e.g., 591) is adapted to receive the SBU system wakeup signal (e.g., if transmitted via the SBU first system port by the SBU 520).

The SBU 520 can further comprise an SBU second system port (e.g., downstream D-port 592), an SBU local port (e.g., local L-port 562), an SBU wakeup input, an SBU transceiver 522, an SBU controller 524, and an SBU energy detector 526. The SBU transceiver 522 is coupled to the SBU first system port, the SBU second system port, the SBU local port and the SBU wakeup input.

The SBU first system port (e.g., 582) is adapted to receive an SBU first system input signal, the SBU second system port (e.g., 592) is adapted to receive an SBU second system input signal, and the SBU local port (e.g., 562) is adapted to receive an SBU local input signal. The SBU transceiver 522 is configured to transfer data of the SBU first system input signal to the SBU second system port (e.g., 592) in an SBU first mode (e.g., active mode), and the SBU transceiver 522 is configured to conserve power in an SBU second mode (e.g., power conservation mode). The SBU transceiver 522 is configured to enter the SBU first mode in response to an SBU local wakeup signal. The SBU transceiver 522 is configured to transmit an SBU system wakeup signal at one of the SBU first system port and the SBU second system port in response to the SBU local wakeup signal.

Generally, the SBU 520 can detect a wakeup signal at any of the first system port (e.g., 582), the SBU second system port (e.g., 592), and the SBU local port (e.g., 562). The SBU 520 is configured (in response to a detected wakeup signal) to generate a subsequent wakeup signal to be transmitted to the ports from which the detected wakeup signal was received. In a first scenario, a wakeup signal is detected via the SBU local port (e.g., 562) and in response the SBU transceiver 522 transmits a system wakeup signal via the SBU first system port (e.g., 582) and via the SBU second system port (e.g., 592). In a second scenario, a wakeup signal is detected via the SBU first system port (e.g., 582) and in response the SBU transceiver 522 transmits a system wakeup signal via the SBU second system port (e.g., 592) and transmits a local wakeup signal via the SBU local port (e.g., 562). In a third scenario, a wakeup signal is detected via the SBU second system port (e.g., 592) and in response the SBU transceiver 522 transmits a system wakeup signal via the SBU first system port (e.g., 582) and transmits a local wakeup signal via the SBU local port (e.g., 562). Transmitting a local wakeup signal to the touch display 572 in response to the SBU 522 receiving a system wakeup signal from one of the FBU 510 or the third bus unit 530 can signal the touch display to transition from a power conservation mode to an active mode.

The SBU controller 524 has an SBU energy detected input and an SBU wakeup output, the SBU wakeup output being coupled to the SBU wakeup input. The SBU controller 524 is configured to generate the SBU local wakeup signal at the SBU wakeup output in response to an SBU energy detected signal.

The SBU energy detector 526 has an SBU energy detected output that is coupled to the SBU energy detected input. The SBU energy detector 526 is coupled to the SBU first system port (e.g., 582), the SBU second system port (e.g., 592) and the SBU local port (e.g., 562). The SBU energy detector 526 is configured to generate the SBU energy detected signal at the SBU energy detected output in response to an SBU detection of energy of one of the SBU first system input signal (e.g., via node 582a), the SBU second system input signal (e.g., via bus 552), and the SBU local input signal (e.g., via node 562a) received by the SBU transceiver 522 in the SBU second mode.

In the first example system, the system 500 further includes a third bus unit (TBU) 530 having a TBU first system port (e.g., upstream U-port 583), an optional TBU second system port (e.g., downstream D-port 593), a TBU local port (e.g., local L-port 563), a TBU wakeup input, a TBU transceiver 532, a TBU controller 534, and a TBU energy detector 536. The TBU first system port (e.g., 583) is coupled to the SBU second system port (e.g., 592). The TBU transceiver 532 is coupled to the TBU first system port, the optional TBU second system port, the TBU local port and the TBU wakeup input.

The TBU first system port (e.g., 583) is adapted to receive a TBU first system input signal, the optional TBU second system port (e.g., 593) can be adapted to receive a TBU second system input signal, and the TBU local port (e.g., 563) is adapted to receive a TBU local input signal. The TBU transceiver 532 is configured to transfer data of the TBU first system input signal to one of the TBU local port (e.g., 563) and the TBU second system port (e.g., 593) in a TBU first mode (e.g., active mode), and the TBU transceiver 532 is configured to conserve power in a TBU second mode (e.g., power conservation mode). The TBU transceiver 532 is configured to enter the TBU first mode in response to a TBU local wakeup signal. The TBU transceiver 532 is configured to transmit a TBU system wakeup signal at one of the TBU first system port and the TBU local port in response to the TBU local wakeup signal. The SBU second system port (e.g., 592) is adapted to receive the TBU system wakeup signal (e.g., in response to the TBU system wakeup signal being transmitted via the TBU first system port by the TBU 530).

Generally, the TBU 530 can detect a wakeup signal at any of the first system port (e.g., 583), the TBU second system port (e.g., 593), and the TBU local port (e.g., 563). The TBU 530 is configured (in response to a detected wakeup signal) to generate a subsequent wakeup signal to be transmitted to the ports from which the detected wakeup signal was received. In a first scenario, a wakeup signal is detected via the TBU local port (e.g., 563) and in response the TBU transceiver 532 transmits a system wakeup signal via the TBU first system port (e.g., 583) and via the TBU second system port (e.g., 593). In a second scenario, a wakeup signal is detected via the TBU first system port (e.g., 583) and in response the TBU transceiver 532 transmits a system wakeup signal via the TBU second system port (e.g., 593) and transmits a local wakeup signal via the TBU local port (e.g., 563). In a third scenario, a wakeup signal is detected via the TBU second system port (e.g., 593) and in response the TBU transceiver 532 transmits a system wakeup signal via the TBU first system port (e.g., 583) and transmits a local wakeup signal via the TBU local port (e.g., 563). Transmitting a local wakeup signal to the touch display 573 in response to the TBU 530 receiving a system wakeup signal from one of the SBU 520 or the fourth bus unit 540 can signal (e.g., command) the touch display to transition from a power conservation mode to an active mode.

The TBU controller 534 has a TBU energy detected input and a TBU wakeup output, the TBU wakeup output being coupled to the TBU wakeup input. The TBU controller 534 is configured to generate the TBU local wakeup signal at the TBU wakeup output in response to a TBU energy detected signal.

The TBU energy detector 536 has a TBU energy detected output that is coupled to the TBU energy detected input. The TBU energy detector 536 is coupled to the TBU first system port (e.g., 583), the TBU second system port (e.g., 593) and the TBU local port (e.g., 563). The TBU energy detector 536 is configured to generate the TBU energy detected signal at the TBU energy detected output in response to a TBU detection of energy of one of the TBU first system input signal (e.g., via node 583a), the optional TBU second system input signal (e.g., via bus 553), and the TBU local input signal (e.g., via node 563a) received by the TBU transceiver 532 in the TBU second mode.

In the first example system, the system 500 can further includes additional (e.g., optional) bus units for extending the serially chained system bus. For example, the forth bus unit 540 has a first system port (e.g., upstream U-port 584), a second system port (e.g., downstream D-port 594), a local port (e.g., local L-port 564), a wakeup input, a transceiver 542, a controller 544, and an energy detector 546. The first system port (e.g., 584) is coupled to the TBU second system port (e.g., 593).

The first system port (e.g., 584) is adapted to receive a first system input signal, the optional second system port (e.g., 594) can be adapted to receive a second system input signal, and the local port (e.g., 564) is adapted to receive a local input signal. The transceiver 542 is configured to transfer data of the first system input signal to one of the local port (e.g., 564) and the second system port (e.g., 594) in a first mode (e.g., active mode), and the transceiver 542 is configured to conserve power in a second mode (e.g., power conservation mode). The transceiver 542 is configured to enter the first mode in response to a local wakeup signal. The transceiver 542 is configured to transmit a system wakeup signal at one of the first system port and the local port in response to the local wakeup signal. The TBU second system port (e.g., 593) is adapted to receive the fourth bus unit-generated system wakeup signal (e.g., in response to the fourth bus unit system wakeup signal being transmitted via the fourth bus unit first system port by the fourth bus unit 540.

The controller 544 has an energy detected input and a wakeup output, the wakeup output being coupled to the wakeup input. The controller 544 is configured to generate the local wakeup signal at the wakeup output in response to an energy detected signal.

The energy detector 546 has an energy detected output that is coupled to the energy detected input. The energy detector 546 is coupled to the first system port (e.g., 584), the second system port (e.g., 594) and the local port (e.g., 564). The energy detector 546 is configured to generate the energy detected signal at the energy detected output in response to a detection of energy of one of the first system input signal (e.g., via node 584a), the optional second system input signal (e.g., via bus 554), and the local input signal (e.g., via node 564a) received by the transceiver 542 in the second mode.

In the first example system, the system 500 further includes a user interface (UI) device, such as one of the touch displays 572, 573, and 574. The touch display 572 is coupled to a switch 527 (e.g., similar to switch 427) of transceiver 522 of the SBU 520 via cable 405 and local port 562, the touch display 573 is coupled to a switch 537 (e.g., similar to switch 437) of transceiver 532 of the TBU 530 via cable 407 and local port 563, and the touch display 574 is coupled to a switch 547 (e.g., similar to switch 447) of transceiver 542 of a fourth bus unit 540 via cable 409 and local port 564.

With respect to the FBU 510, a UI device (e.g., sensors 402 and head unit 401) includes a UI port (e.g., 560) coupled to the FBU local port (561), where the UI device is adapted to receive a user input (such as a user touch, user voice, user manipulation, proximity detection, and physical or electronic indications). The FBU 510 is configured to generate a user wakeup signal at the UI port in response to the user input. The FBU 510 is configured to generate the SBU system wakeup signal in response to the user wakeup signal. The SBU 520 is configured to generate the SBU local wakeup signal in response to the FBU system wakeup signal.

With respect to the SBU 520, a UI device (e.g., touch display 572) includes a UI port (e.g., 405) coupled to the SBU local port (562), where the UI device is adapted to receive a user input. The SBU 520 is configured to generate a user wakeup signal at the UI port in response to the user input. The SBU 520 is configured to generate the SBU system wakeup signal in response to the user wakeup signal. The FBU 510 is configured to generate the FBU local wakeup signal in response to the SBU system wakeup signal, and the TBU 530 is configured to generate the FBU local wakeup signal in response to the SBU system wakeup signal.

With respect to the TBU 530, a UI device (e.g., touch display 573) includes a UI port (e.g., 407) coupled to the TBU local port (563), where the UI device is adapted to receive a user input. The TBU 530 is configured to generate a user wakeup signal at the UI port in response to the user input. The TBU 530 is configured to generate the TBU system wakeup signal in response to the user wakeup signal. The SBU 520 is configured to generate the SBU local wakeup signal in response to the TBU system wakeup signal, and the fourth bus unit 540 is configured to generate a fourth bus unit local wakeup signal in response to the TBU system wakeup signal.

With respect to the fourth bus unit 540, a UI device (e.g., touch display 574) includes a UI port (e.g., 409) coupled to the fourth bus unit local port (564), where the UI device is adapted to receive a user input. The fourth bus unit 540 is configured to generate a user wakeup signal at the UI port in response to the user input. The fourth bus unit 540 is configured to generate the fourth bus unit system wakeup signal in response to the user wakeup signal. The TBU 530 is configured to generate the TBU local wakeup signal in response to the fourth bus unit system wakeup signal, and any serially chained additional bus unit is configured to generate a respective unit local wakeup signal in response to the system wakeup signal of an adjacent serially chained bus unit.

In a second example system, the system 500 includes a power management system 508. The power management system 508 includes power managers such as a PMIC (power manager integrated circuit) 518 coupled to the FBU 510, a PMIC 528 coupled to the SBU 520, a PMIC 538 coupled to the TBU 530, and a PMIC 548 coupled to the fourth bus unit 540. The PMIC 518, PMIC 528, the PMIC 538, and the PMIC 548 can be included on a common substrate, can be included on a substrate that includes the bus unit to which a respective PMIC is coupled, and/or combinations thereof. Power for operating controls, for example, of the power manager and energy detection circuitry can be provided (e.g., coupled) via the VDDKA (first power rail keep-alive) power signal (e.g., which allows a reduced consumption of power in a power conservation mode).

In a second example system, the system 500 includes a circuit (such as SBU 520) that includes a transceiver (e.g., 522), a controller (e.g., 524), and an energy detector (e.g., 526).

The transceiver (e.g., 522) has a first system port (e.g., a first selected one of 582 and 592), a second system port (e.g., a second selected one of 582 and 592 that is different from the first selected one of 582 and 592), a local port (e.g., 562) and a wakeup input. The first system port is adapted to receive a first system input signal, the second system port is adapted to receive a second system input signal, and the local port is adapted to receive a local input signal. The transceiver is configured to transfer data of the first system input signal to the second system port in a first mode, the transceiver is configured to conserve power in a second mode, the transceiver is configured to enter the first mode in response to a local wakeup signal, and the transceiver is configured to transmit a system wakeup signal at the second system port in response to the local wakeup signal.

The controller (e.g., 524) has an energy detected input and a wakeup output, the wakeup output coupled to the wakeup input. The controller is configured to generate the local wakeup signal at the wakeup output in response to an energy detected signal.

The energy detector (e.g., 526) has an energy detected output coupled to the energy detected input. The energy detector is coupled to the first system port and the local port. The energy detector is configured to generate the energy detected signal at the energy detected output in response to a detection of energy of one of the first system input signal and the local input signal received by the transceiver in the second mode.

In an example, the transceiver is further configured to transfer data of the second system input signal to the first system port in the first mode. In the example, the system wakeup signal can include a wakeup pattern.

In another example, the transceiver is further configured to transmit the system wakeup signal at the first system port in response to the local wakeup signal in the second mode.

In yet another example, the energy detector is configured to detect energy of one of the first system input signal and the local input signal. In the example, the energy detector can be coupled to the second system port and the energy detector can be configured to detect energy of the second system input signal. In the example, the energy detector is configured to generate the energy detected signal at the energy detected output in response to a detection of energy of the second system input signal received by the transceiver in the second mode.

In a further example, the controller is further coupled to the first system port and the local port. The controller is further configured to detect a wakeup pattern in one of the first system input signal and the local input signal responsive to the energy detected signal. In the example, the controller can further comprise a data valid output, where the controller is configured to generate a data valid signal at the data valid output responsive to a detection of a wakeup pattern in one of the first system input signal and the local input signal. In the example, the energy detector can further include a data valid input and an enable power output, where the data valid input is coupled to the data valid output, and the energy detector further configured to generate an enable power signal at the enable power output. In the example, the circuit can further comprise a power manager, where the power manager includes an enable power input and a power supply output, where the enable power input is coupled to the enabled power output, and the power manager is configured to generate a power signal at the power supply output responsive to the enable power signal. In the example, the controller further comprises a power supply input, where the power supply input is coupled to the power supply output, and the controller is further configured to generate the local wakeup signal responsive to the power signal. In the example system, the circuit the power manager can further comprise a logic enable output and the controller can further comprises a logic enable input, where the logic enable input is coupled to the logic enable output, where the power manager can be further configured to generate the logic enable signal at the logic enable output responsive to the power signal, and the controller can be further responsive to generate the local wakeup signal responsive to the logic enable signal.

Figure 6:
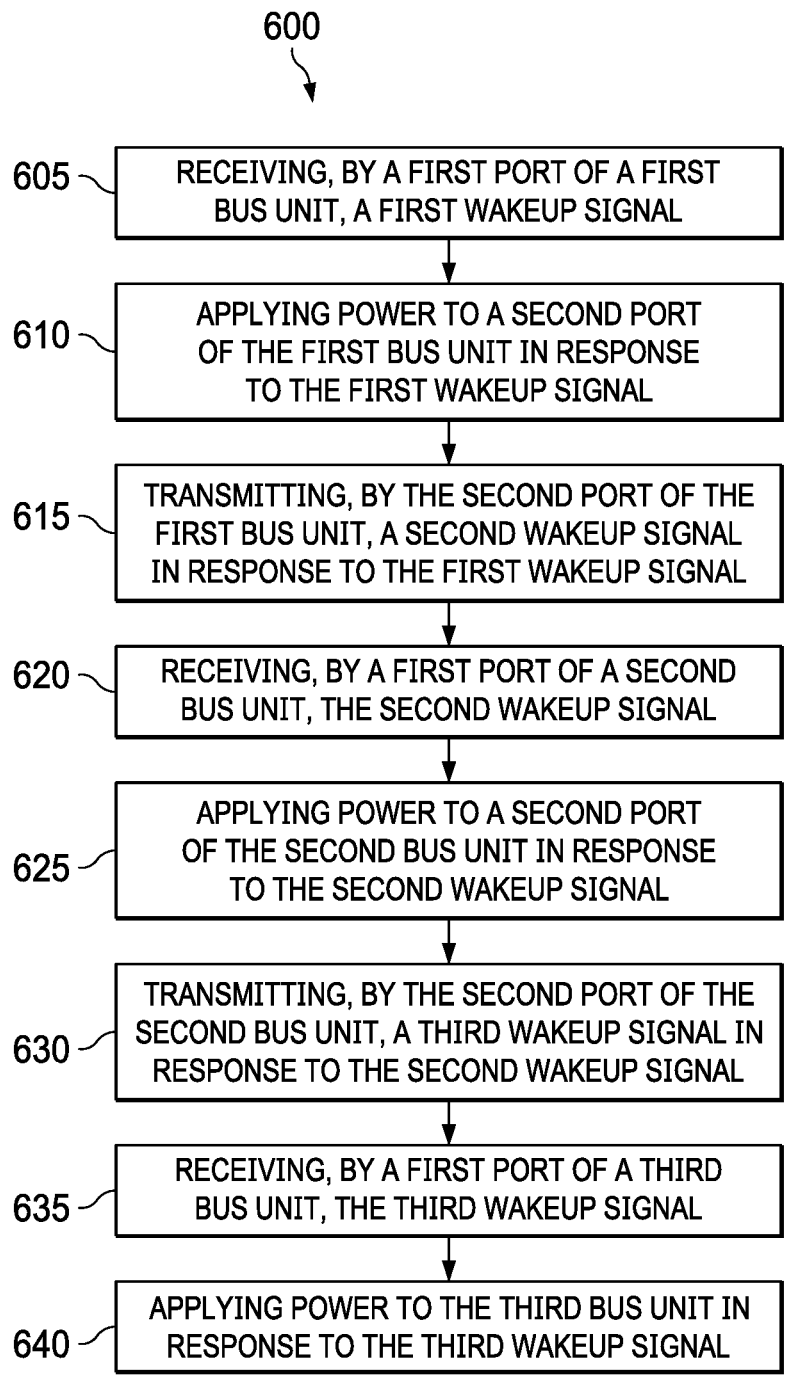
FIG. 6 is a flow diagram of an example method of wakeup signal promulgation of the example system of FIG. 5.

FIG. 6 is a flow diagram of an example method of wakeup signal promulgation of the example system of FIG. 5. The example method 600, can include various techniques described herein following. In various implementations, the described operations need not be performed in the described order. In the example method 600, the method can be initiated at 605.

At 605, the method can include receiving, by a first port of a first bus unit (FBU), a first wakeup signal. For example, a first wakeup signal can be generated by a head unit 401 responsive to sensors 502. The first wakeup signal can be received by the FBU 510 at the local port 561. The method can continue at 610.

At 610, the method can include applying power to a second port of the FBU in response to the first wakeup signal. For example, power management circuitry such as PMIC 518 can couple operating power to a transmitter (e.g., of transceiver 512) so that the transmitter can exit a power conservation mode and enter an active mode (e.g., in which a signal can be transmitted). In an example, the power can be coupled by energizing a power supply. In another example, a system clock is activated (e.g., promulgated) so that additional power is drawn in response to the switching of active CMOS circuitry being switched by the activated system clock. In an implementation, an entire bus unit can be placed in an active mode by applying power to all bus unit active circuitry responsive to a received wakeup signal. The method can continue at 615.

At 615, the method can include transmitting, by the second port of the FBU, a second wakeup signal in response to the first wakeup signal. For example, a transmitter portion of the transceiver 512 can transmit the second wakeup signal from a second port (e.g., the first system port 591). The method can continue at 620.

At 620, the method can include receiving, by a first port of a second bus unit (SBU), the second wakeup signal. For example, the second wakeup signal can be generated by the FBU 510 responsive to the first wakeup signal. The second wakeup signal can be received by the SBU 520 at the first system port 582. The method can continue at 625.

At 625, the method can include applying power to a second port of the SBU in response to the second wakeup signal. For example, power management circuitry such as PMIC 528 can couple operating power to a transmitter (e.g., of transceiver 522) so that the transmitter can exit a power conservation mode and enter an active mode (e.g., in which a signal can be transmitted). The method can continue at 630.

At 630, the method can include transmitting, by the second port of the SBU, a third wakeup signal in response to the second wakeup signal. For example, a transmitter portion of the transceiver 522 can transmit the third wakeup signal from a second port (e.g., the second system port 592). A transmitter portion of the transceiver 522 can optionally send, in response to the second wakeup signal, a local wakeup signal from a third port (e.g., 562) to a locally coupled device (e.g., touch display 572). The method can continue at 635.

At 635, the method can include receiving, by a first port of a third bus unit (TBU), the third wakeup signal. For example, the third wakeup signal can be generated by the SBU 520 responsive to the second wakeup signal. The third wakeup signal can be received by the TBU 530 at the first system port 582. The method can continue at 625.

At 640, the method can include applying power to the TBU in response to the third wakeup signal. For example, power management circuitry such as PMIC 538 can couple operating power to the TBU 530 so that the TBU 530 can exit a power conservation mode and enter an active mode (e.g., in which signals can be actively received and transmitted). Accordingly, a local wakeup event can be promulgated across and through a serial chain of bus units in the system 500 described herein.

Figure 7:
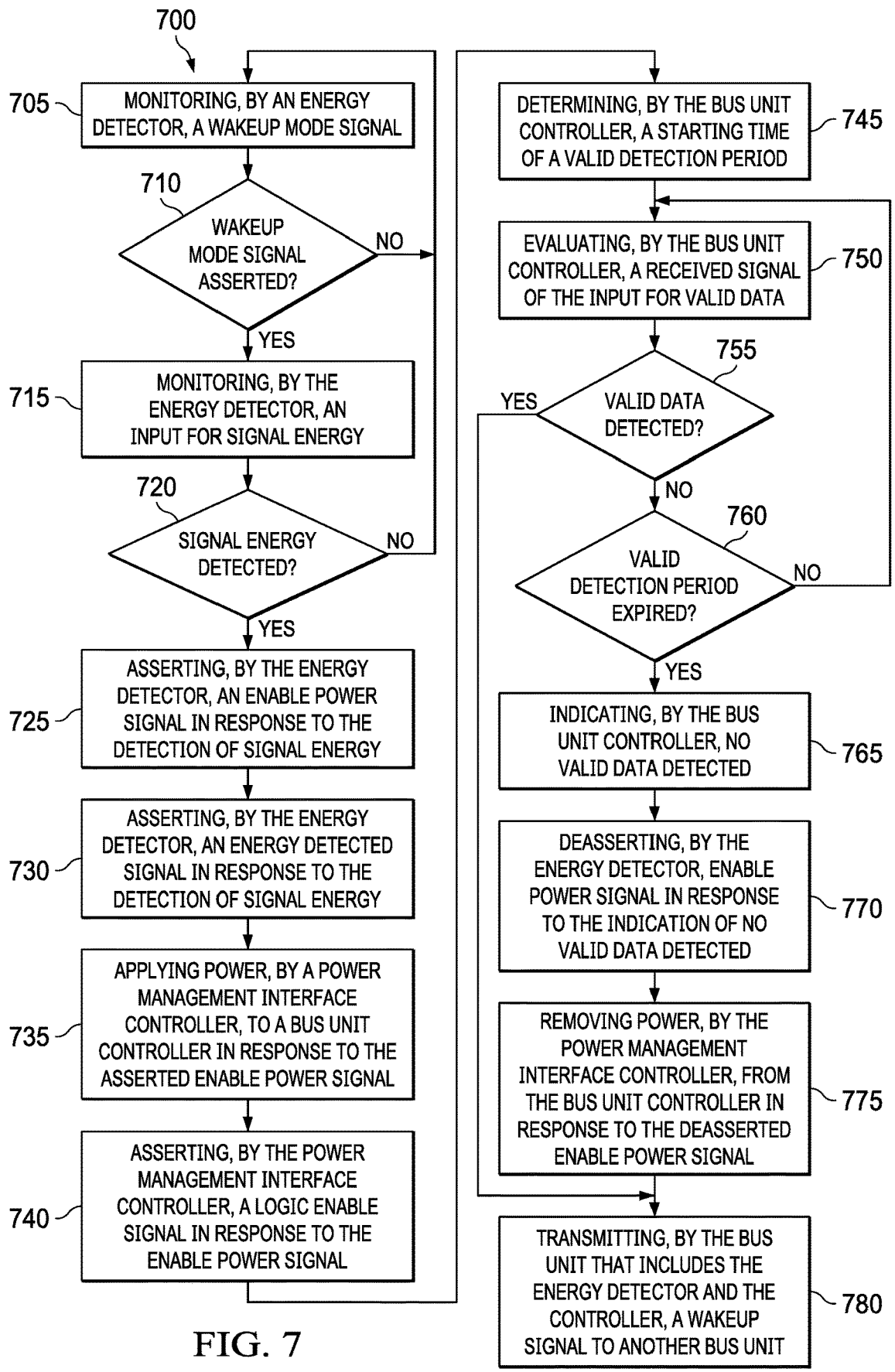
FIG. 7 is a flow diagram of an example method wakeup signal detection and wakeup signal handling of the example system of FIG. 5.

FIG. 7 is a flow diagram of an example method wakeup signal detection and wakeup signal handling of the example system of FIG. 5. The example method 700, can include various techniques described herein following. In various implementations, the described operations need not be performed in the described order. In the example method 700, the method can be initiated at 705.

At 705, the method can include monitoring, by an energy detector, a wakeup mode signal. For example, the wakeup mode signal can be the VDDKA signal, which can supply operating power to an energy detector of a bus unit. The method can continue at 710.

At 710, the method continues at 715 if the wakeup mode signal is asserted; if not, the method continues at 705.

At 715, the method can include monitoring, by the energy detector, an input signal for signal energy. For example, the energy detector of a bus unit can compare a field strength, current, and/or voltage level carried by an electrical conductor against a threshold to detect a quantized change in the input signal. The signal net (e.g., signal line) can be a dedicated wakeup signal conductor or can be used for other purposes (e.g., a signal lane for receiving video stream information from an upstream source) while the bus unit is operating in an active mode. The method continues at 720.

At 720, the method continues at 725 if signal energy is detected; if not, the method continues at 705.

At 725, the method can include asserting, by the energy detector, an enable power signal in response to the detection of signal energy. The method continues at 730.

At 730, the method can include asserting, by the energy detector, an energy detected signal in response to the detection of signal energy. The method continues at 735.

At 735, the method can include applying power, by a power management interface controller, to a controller of the bus unit in response in response to the asserted enable power signal. The method continues at 740.

At 740, the method can include asserting, by the power management interface controller, a logic enable signal in response in response to the enable power signal. For example, the logic enable signal can be asserted after a duration in which logic circuits of the controller can stabilize after an application of power. The method continues at 745.

At 745, the method can include determining, by the controller, a starting time of a valid detection period. For example, the controller, responsive to the logic enable signal, can determine a start time (e.g., start a timer) of a valid detection period during which the input signal (e.g., a potential wakeup signal) is evaluated for valid data (e.g., a wakeup pattern). The method continues at 750.

At 750, the method can include evaluating, by the controller of the bus unit, a received signal of the input signal for valid data. For example, the input signal can be evaluated to determine the presence of a wakeup pattern. The valid data can also include a wakeup code configured to identify the bus unit from which the wakeup signal in the input signal was received. The wakeup pattern can be encoded to decrease entropy (e.g., to reduce false positives resulting from injected noise). The method continues at 755.

At 755, the method continues at 780 if valid data is detected; if not, the method continues at 760.

At 760, the method continues at 765 if the valid detection period has expired (e.g., has been exceeded); if not, the method continues at 750.

At 765, the method can include indicating, by the controller of the bus unit, that no valid data has been detected. The method continues at 770.

At 770, the method can include de-asserting, by the energy detector, the enable power signal in response to the indication of no valid data being detected. For example, the enable power signal can be de-asserted by negating an active-low signal (e.g., valid data-) that indicates that valid data has been detected. The method continues at 775.

At 775, the method can include removing power, by the power management interface controller, from the controller of the bus unit in response to the de-asserted enable power signal. The method continues at 705.

At 780, the method can include transmitting, by the bus unit (e.g., a first bus unit that includes the energy detector and the controller), a wakeup signal (e.g., a second wakeup signal) to another bus unit (e.g., a second bus unit). For example, the first bus unit can send the second wakeup signal to the second bus unit, where the second wakeup signal is encoded with an identifier of the first bus unit, and where the second bus unit is not the bus unit from which the first wakeup signal was sent. The wakeup signal can include a repeating pattern, so that the wakeup signal can be transmitted (e.g., repeatedly transmitted) over a valid detection period. The length (e.g., duration) of the valid detection period can be selected for a respective bus unit.

Figure 8:
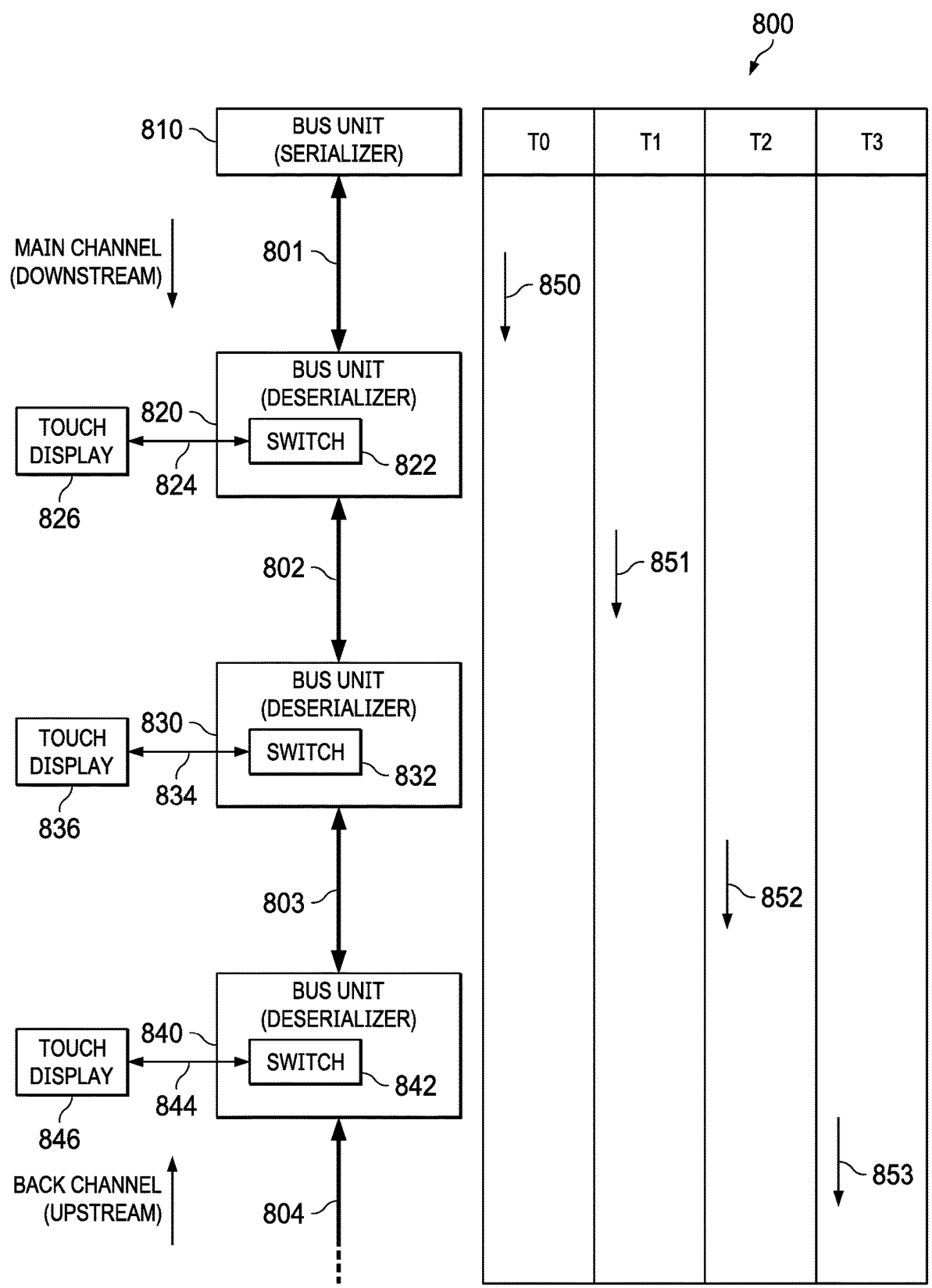
FIG. 8 is a block diagram of a first example wakeup signal handling scenario in an example system.

FIG. 8 is a block diagram of a first example wakeup signal handling scenario in an example system. In the example, the system 800 includes serially chained bus units such as 810, 820, 830, and 840. The bus units can be deserializers (which can include both serializing circuits and deserializing circuits per se) and/or disaggregators (described hereinabove with respect to FIG. 4).

The FBU 810 can be similar to the multistream generator 410 and/or FBU 510. The FBU 810 can be locally coupled to various devices (e.g., sensors 402 and head unit 401), which can generate a local wakeup signal in response to input generated by any coupled sensor. The FBU 810 is upstream (e.g., relative to a direction of a majority of video stream flows in a system bus main channel) of the SBU 820. The FBU 810 is coupled to the SBU 820 via a cable 801. The cable 801 (and each of the cables 802, 803, and 804) can be a cable harness that includes conductor(s) (e.g., twisted pair, coax, or optical fiber) for sending and/or receiving wakeup signals. In some examples, conductors reserved as "lanes" for video streaming in an active mode can be used to transmit a wakeup signal to an adjacent bus unit that is in a power conservation mode.

The FBU 810 is coupled to the second bus unit (SBU) 820 via cable 801. The SBU 820 is locally coupled via cable 824 to the touch display 826 (which can be similar to touch display 572), where the SBU 820 is configured to disaggregate (by switch 822) a video in active mode and send a disaggregated stream to the touch display 826. The SBU 820 is coupled to the third bus unit (TBU) 830 via cable 802. The TBU 830 is locally coupled via cable 834 to the touch display 836 (which can be similar to touch display 573), where the TBU 830 is configured to disaggregate (by switch 832) a video in active mode and send a disaggregated stream to the touch display 836. The TBU 830 is coupled to the fourth bus unit 840 via cable 803. The fourth bus unit 840 is locally coupled via cable 844 to the touch display 846 (which can be similar to touch display 574), where the fourth bus unit 840 is configured to disaggregate (by switch 842) a video in active mode and send a disaggregated stream to the touch display 846. The fourth bus unit 840 can be coupled to an adjacent (e.g., downstream) bus unit via a cable 804 (where even more downstream bus units can be serially chained in along a system bus, where each of the additional downstream units can be locally coupled with similar circuits).

In the first example scenario, a first bus unit (e.g., FBU 810) is configured to generate (e.g., transmit) a system wakeup signal 850 at a first time (e.g., time T0) in response to a user wakeup signal (such as generated by the sensors 402 and head unit 401). The system wakeup signal 850 is generated at a first output (e.g., cable 801). A second bus unit (e.g., SBU 820) is configured to generate (e.g., transmit) a system wakeup signal 851 at a second time (e.g., time T1, which follows the first time) in response to the system wakeup signal 850. The system wakeup signal 851 is generated at a second output (e.g., cable 802). A third bus unit (e.g., TBU 830) is configured to generate (e.g., transmit) a system wakeup signal 852 at a third time (e.g., time T2, which follows the second time) in response to the system wakeup signal 851. The system wakeup signal 852 is generated at a third output (e.g., cable 803). A fourth bus unit (e.g., fourth bus unit 840) is configured to generate (e.g., transmit) a system wakeup signal 853 at a fourth time (e.g., time T3, which follows the third time) in response to the system wakeup signal 852. The system wakeup signal 853 is generated at a fourth output (e.g., cable 804).

Figure 9:
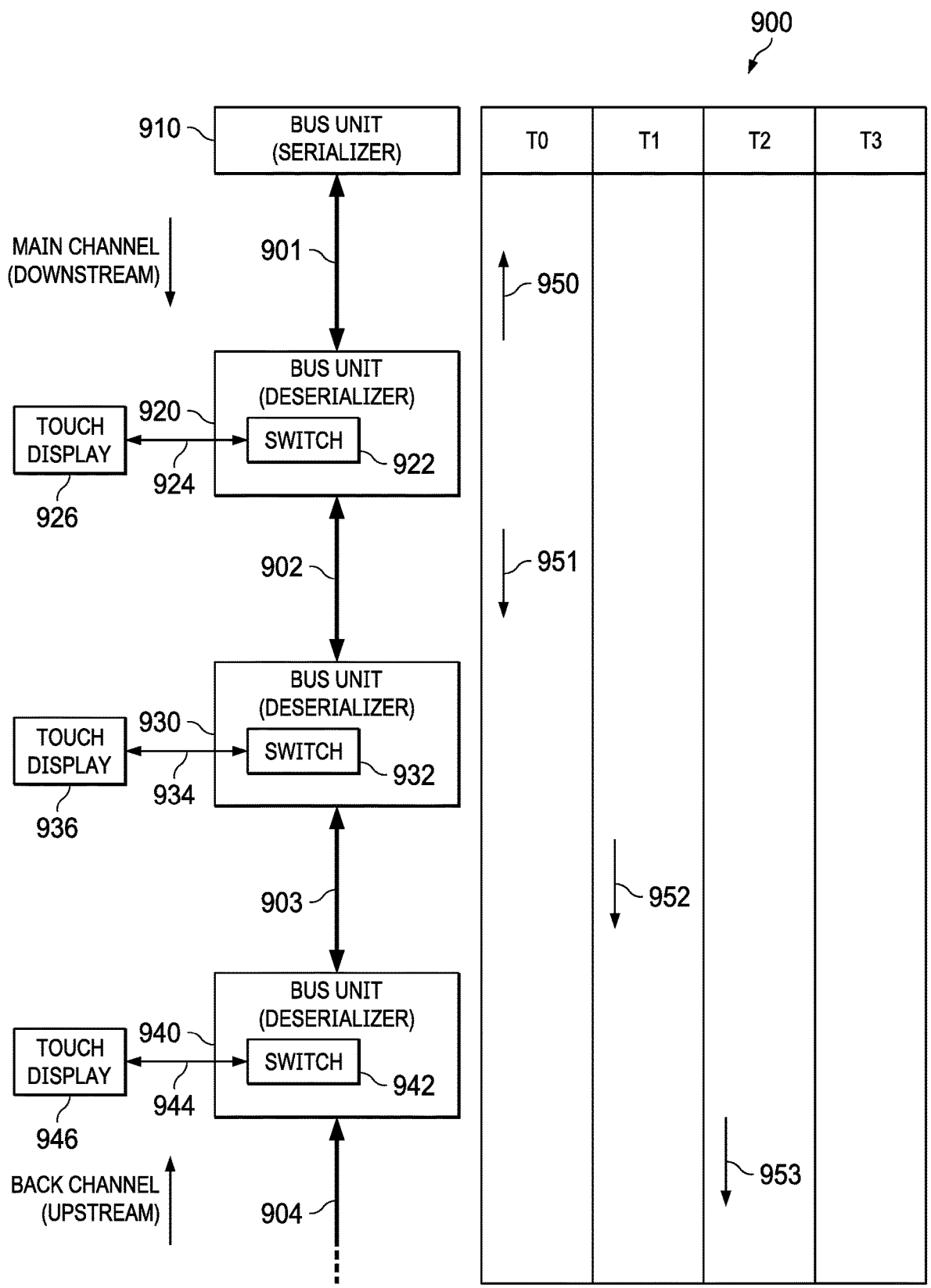
FIG. 9 is a block diagram of a second example wakeup signal handling scenario in an example system.

FIG. 9 is a block diagram of a second example wakeup signal handling scenario in an example system. In the example, the system 900 includes serially chained bus units such as 910, 920, 930, and 940. The bus units can be deserializers and/or disaggregators.

The FBU 910 can be similar to the multistream generator 410 and/or FBU 510. The FBU 910 can be locally coupled to various devices (e.g., sensors 402 and head unit 401), which can generate a local wakeup signal in response to input generated by any coupled sensor. The FBU 910 is upstream of the SBU 920. The FBU 910 is coupled to the SBU 920 via a cable 901. The cable 901 (and each of the cables 902, 903, and 904) can be a cable harness that includes conductor(s) for sending and/or receiving wakeup signals. In some examples, conductors reserved as "lanes" for video streaming in an active mode can be used to transmit a wakeup signal to an adjacent bus unit that is in a power conservation mode.

The FBU 910 is coupled to the second bus unit (SBU) 920 via cable 901. The SBU 920 is locally coupled via cable 924 to the touch display 926 (which can be similar to touch display 572), where the SBU 920 is configured to disaggregate (by switch 922) a video in active mode and send a disaggregated stream to the touch display 926. The SBU 920 is coupled to the third bus unit (TBU) 930 via cable 902. The TBU 930 is locally coupled via cable 934 to the touch display 936 (which can be similar to touch display 573), where the TBU 930 is configured to disaggregate (by switch 932) a video in active mode and send a disaggregated stream to the touch display 936. The TBU 930 is coupled to the fourth bus unit 940 via cable 903. The fourth bus unit 940 is locally coupled via cable 944 to the touch display 946 (which can be similar to touch display 574), where the fourth bus unit 940 is configured to disaggregate (by switch 942) a video in active mode and send a disaggregated stream to the touch display 946. The fourth bus unit 940 can be coupled to an adjacent (e.g., downstream) bus unit via a cable 904 (where even more downstream bus units can be serially chained in along a system bus, where each of the additional downstream units can be locally coupled with similar circuits).

In the second example scenario, a first bus unit (e.g., SBU 920) is configured to generate (e.g., transmit) a system wakeup signal 950 at a first time (e.g., time T0) in response to a user wakeup signal (such as generated by the touch display 926). The system wakeup signal 950 is generated at a first output (e.g., cable 901). The first bus unit (e.g., SBU 920) is further configured to generate (e.g., transmit) a system wakeup signal 951 at the first time (e.g., time T0) in response to the user wakeup signal (such as generated by the touch display 926). The system wakeup signal 951 is generated at a second output (e.g., cable 902). A second bus unit (e.g., TBU 930) is configured to generate (e.g., transmit) a system wakeup signal 952 at a second time (e.g., time T1, which follows the first time) in response to the system wakeup signal 951. The system wakeup signal 952 is generated at a third output (e.g., cable 903). A third bus unit (e.g., fourth bus unit 940) is configured to generate (e.g., transmit) a system wakeup signal 953 at a third time (e.g., time T2, which follows the second time) in response to the system wakeup signal 952. The system wakeup signal 953 is generated at a fourth output (e.g., cable 904).

Figure 10:
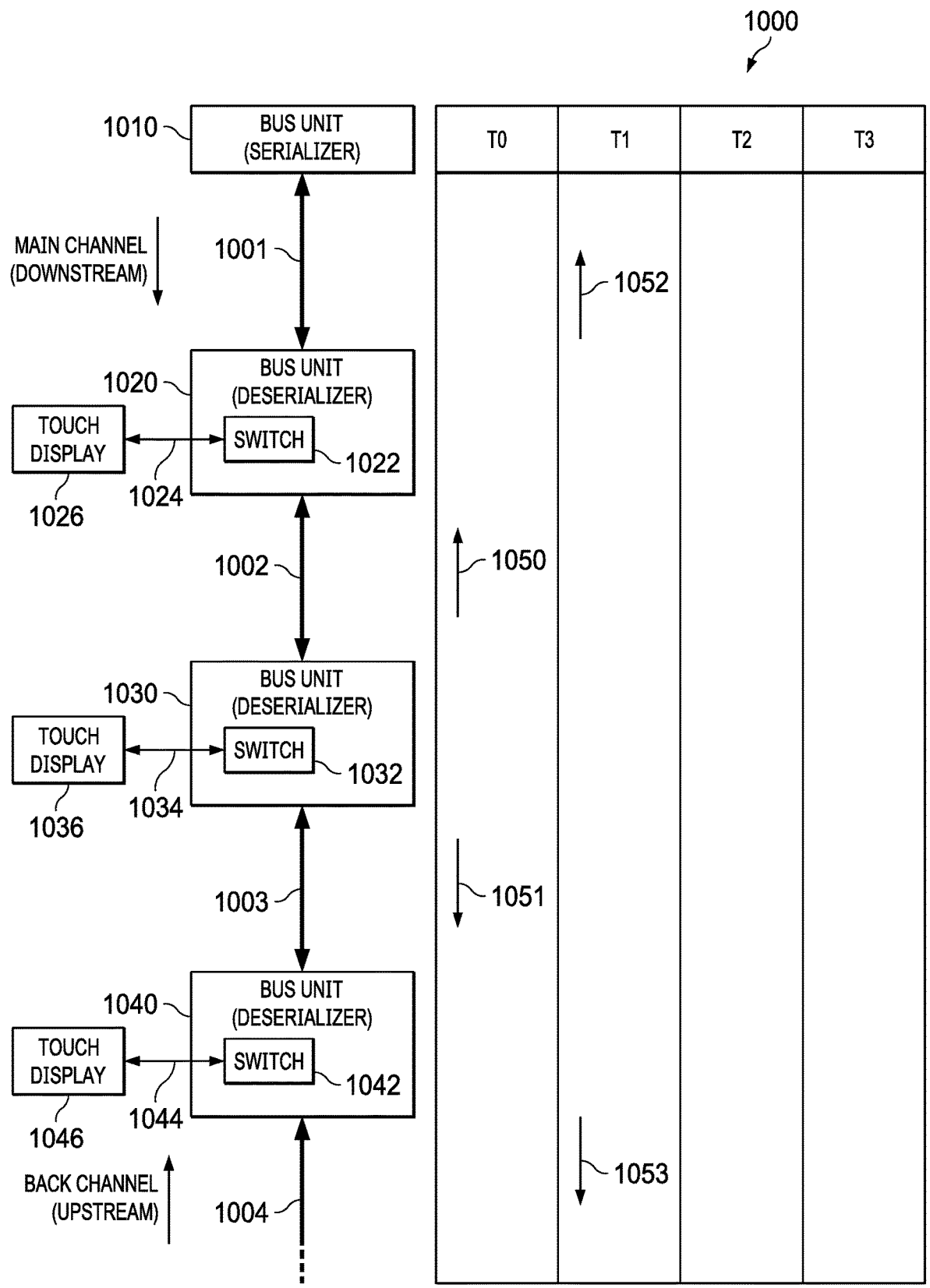
FIG. 10 is a block diagram of a third example wakeup signal handling scenario in an example system.

FIG. 10 is a block diagram of a third example wakeup signal handling scenario in an example system. In the example, the system 1000 includes serially chained bus units such as 1010, 1020, 1030, and 1040. The bus units can be deserializers and/or disaggregators.

The FBU 1010 can be similar to the multistream generator 410 and/or FBU 510. The FBU 1010 can be locally coupled to various devices (e.g., sensors 402 and head unit 401), which can generate a local wakeup signal in response to input generated by any coupled sensor. The FBU 1010 is upstream of the SBU 1020. The FBU 1010 is coupled to the SBU 1020 via a cable 1001. The cable 1001 (and each of the cables 1002, 1003, and 1004) can be a cable harness that includes conductor(s) for sending and/or receiving wakeup signals. In some examples, conductors reserved as "lanes" for video streaming in an active mode can be used to transmit a wakeup signal to an adjacent bus unit that is in a power conservation mode.

The FBU 1010 is coupled to the second bus unit (SBU) 1020 via cable 1001. The SBU 1020 is locally coupled via cable 1024 to the touch display 1026 (which can be similar to touch display 572), where the SBU 1020 is configured to disaggregate (by switch 1022) a video in active mode and send a disaggregated stream to the touch display 1026. The SBU 1020 is coupled to the third bus unit (TBU) 1030 via cable 1002. The TBU 1030 is locally coupled via cable 1034 to the touch display 1036 (which can be similar to touch display 573), where the TBU 1030 is configured to disaggregate (by switch 1032) a video in active mode and send a disaggregated stream to the touch display 1036. The TBU 1030 is coupled to the fourth bus unit 1040 via cable 1003. The fourth bus unit 1040 is locally coupled via cable 1044 to the touch display 1046 (which can be similar to touch display 574), where the fourth bus unit 1040 is configured to disaggregate (by switch 1042) a video in active mode and send a disaggregated stream to the touch display 1046. The fourth bus unit 1040 can be coupled to an adjacent (e.g., downstream) bus unit via a cable 1004 (where even more downstream bus units can be serially chained in along a system bus, where each of the additional downstream units can be locally coupled with similar circuits).

In the third example scenario, a first bus unit (e.g., TBU 1030) is configured to generate (e.g., transmit) a system wakeup signal 1050 at a first time (e.g., time T0) in response to a user wakeup signal (such as generated by the touch display 1036). The system wakeup signal 1050 is generated at a first output (e.g., cable 1002). The first bus unit (e.g., TBU 1030) is further configured to generate (e.g., transmit) a system wakeup signal 1051 at the first time (e.g., time T0) in response to the user wakeup signal (such as generated by the touch display 1036). The system wakeup signal 1051 is generated at a second output (e.g., cable 1003). A second bus unit (e.g., SBU 1020) is configured to generate (e.g., transmit) a system wakeup signal 1052 at a second time (e.g., time T1, which follows the first time) in response to the system wakeup signal 1050. The system wakeup signal 1052 is generated at a third output (e.g., cable 1001). A third bus unit (e.g., fourth bus unit 1040) is configured to generate (e.g., transmit) a system wakeup signal 1053 at the second time (e.g., time T1, which follows the first time) in response to the system wakeup signal 1051. The system wakeup signal 1053 is generated at a fourth output (e.g., cable 1004).

Figure 11:
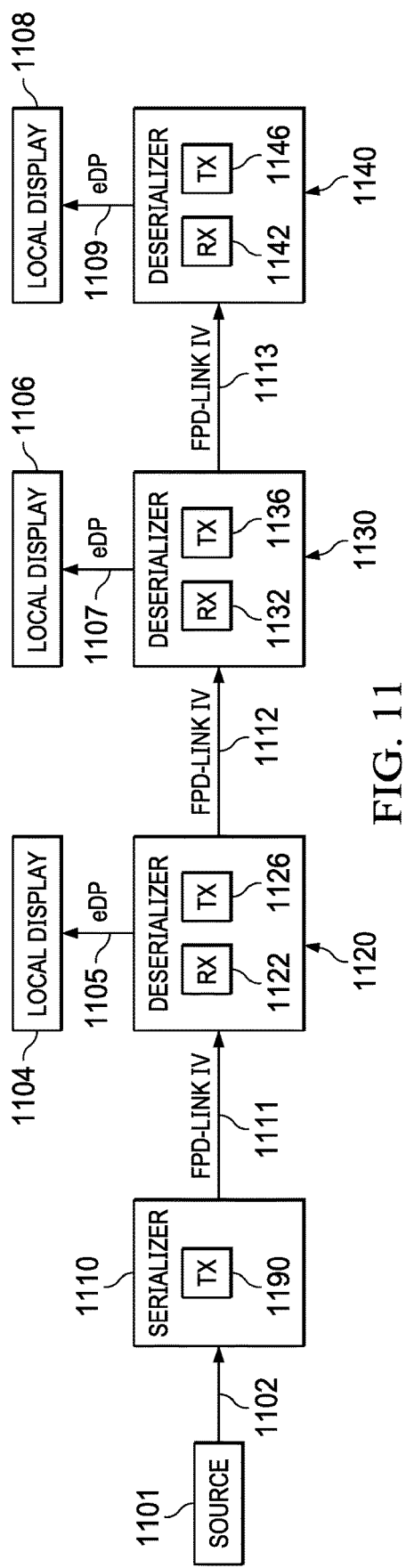
FIG. 11 is a block diagram of another example system that includes at least one stream disaggregator adapted to selectively forward communications between serially chained devices.

FIG. 11 is a block diagram of another example system that includes at least one stream disaggregator adapted to selectively forward communications between serially chained devices. For example, the system 1100 is an example system that includes a source 1101, a serializer 1110 (coupled to source 1101 via cable 1102), a deserializer 1120 (e.g., coupled locally to local display 1104 via cable 1105), a deserializer 1130 (e.g., coupled locally to local display 1106 via cable 1107), and a deserializer 1140 (e.g., coupled locally to local display 1108 via cable 1109).

The cables 1111, 1112, and 1113 each include physical media, through which a system protocol (e.g., system bus) is implemented. The system protocol can be either unidirectional or bidirectional. In an implementation of a bidirectional system protocol: a first bidirectional serial link is established between serializer 1110 and deserializer 1120 across cable 1111 (which is coupled between the serializer 1110 and deserializer 1120); a second bidirectional serial link is established between deserializer 1120 and deserializer 1130 across cable 1112 (which is coupled between the deserializer 1120 and deserializer 1130); and a third bidirectional serial link is established between deserializer 1130 and deserializer 1140 across cable 1113 (which is coupled between the deserializer 1130 and deserializer 1140).

The bidirectional serial link can be either asymmetric or symmetric. An example asymmetric bidirectional link includes an upstream speed (e.g., for bit traffic directed towards the serializer 1110) that is 165 megabits per second and includes a downstream speed (e.g., for bit traffic directed away from the serializer 1110) that is 13 gigabits per second. The asymmetric speeds allow high resolution video to be transmitted downstream at high bit rates (e.g., for transmitting various high-resolution video streams to selected displays), while still allowing a robust bidirectional system control and communication link between devices. An example asymmetric bidirectional link includes symmetric data speeds, so that data can be transferred in either direction at a full rate.

In an example, the source 1101 is a source such as head unit 401. The source 1101 is coupled to the serializer 1110 via cable 1102. Cable 1102 is arranged to carry at least one video stream in accordance with a protocol such as the MIPI CIS.

In the example, the serializer 1110 is a serializer such as multistream generator 410. The serializer 1110 includes a transmitter 1190 such as transmitter 390, which is adapted to transmit a multistream (e.g., which is generated by the serializer 1110 and that includes reformatted information of the at least one video stream carried across a cable 1102), so that the deserializer 1120 can receive and process (e.g., process portions of) the transmitted multistream.

In the example, the deserializer 1120 is a deserializer such as stream disaggregator 420. The deserializer 1120 is coupled to the serializer 1110 via cable 1111. The deserializer 1120 includes a receiver 1122 (such as receiver 422) that is arranged to receive information transmitted by the transmitter 1190. The deserializer 1120 includes a transmitter 1126 (such as stream forwarder 426) that is arranged to transmit information received from the transmitter 1190. Cable 1111 is arranged to carry a multistream output transmitted by the transmitter 1190 in accordance with a protocol such as FPD-link IV. The deserializer 1120 is coupled locally to local display 1104 (such as local display 404) via cable 1105. Cable 1105 is arranged to carry a selected video stream in accordance with a protocol such as eDP (extended display protocol).

In the example, the deserializer 1130 is a deserializer such as stream disaggregator 430. The deserializer 1130 is coupled to the deserializer 1120 via cable 1112. The deserializer 1130 includes a receiver 1132 (such as receiver 422) that is arranged to receive information transmitted by the transmitter 1126. The deserializer 1130 includes a transmitter 1136 (such as stream forwarder 426) that is arranged to transmit information received from the transmitter 1126. Cable 1112 is arranged to carry a multistream output transmitted by the transmitter 1126 in accordance with a protocol such as FPD-link IV. The deserializer 1130 is coupled locally to local display 1106 (such as local display 406) via cable 1107. Cable 1107 is arranged to carry a selected video stream in accordance with a protocol such as eDP.

In the example, the deserializer 1140 is a deserializer such as stream disaggregator 440. The deserializer 1140 is coupled to the deserializer 1130 via cable 1113. The deserializer 1140 includes a receiver 1142 (such as receiver 422) that is arranged to receive information transmitted by the transmitter 1136. The deserializer 1140 optionally includes a transmitter 1146 (such as stream forwarder 426) that is arranged to transmit information received from the transmitter 1136. Cable 1113 is arranged to carry a multistream output transmitted by the transmitter 1136 in accordance with a protocol such as FPD-link IV. The deserializer 1140 is coupled locally to local display 1108 (such as local display 408) via cable 1109. Cable 1109 is arranged to carry a selected video stream in accordance with a protocol such as eDP.

When, for example, the last deserializer in a chain only receives data intended (e.g., addressed) for display on the respective local display that is coupled locally to the last deserializer, the last deserializer need not include a switch such as switch 427.

In at least one example system (such as a vehicle infotainment system), video data is generated from a head unit (e.g., source 1101), where the video data is transferred from the head unit to multiple display panels (e.g., local displays 1104, 1106, and 1108). Each local display can be configured for displaying information using a specific device (such as a HUD, instrument cluster, center-instrument display), where each such device can be located in separate physical locations, and where each such device is serially chained (e.g., daisy chained), so that communications to and from distant devices in chain are coupled through devices coupled more closely to a head unit (e.g., coupled through intermediary devices located between the head unit and the most distant device).

In contrast, the communications between a head unit and display panels in many conventional systems are coupled using direct point-to-point connections, so that communications do not traverse a common physical medium and are coupled through intermediary devices. Many such point-to-point communications are generally optimized for same-board (or same-chip) communications, where external cabling is not necessarily required. In cases where external cabling is used, the cabling used for the direct connections can cause challenges when the cabling is to be routed through limited space areas to devices (such as displays) that are located in disparate locations.

Cost, cabling congestion, and various design challenges can be alleviated by techniques using various examples described herein. As shown in FIG. 11, a head unit is adapted to send and receive information to control the serially coupled displays. Such information can include transmission acknowledgements, operational status of touch controls, and setting system configurations of various devices. The such information can be communicated (e.g., transmitted and received) using an original protocol (such as eDP, I2C, SPI, UART and/or GPIO protocol) that is selected for communicating with a particular device. The information (e.g., management, control and/or configuration information) that is encoded with an original protocol is received by the serializer 1110. The serializer 1110 can re-encode the received information by using a subsequent protocol (e.g., a protocol that is different from the original protocol used by the head unit, where the subsequent protocol can be a high-speed protocol such as FPD-Link III or FPD-Link IV). The serializer 1110 can transmit the subsequently encoded information across the serially coupled cables (e.g., 1111, 1112 and 1113). As described with respect to FIG. 12, a deserializer (e.g., 1120, 1130 or 1140) receiving the subsequently encoded information can decode and re-encode the subsequently encoded information for transmission to a local device (e.g., a display panel).

Figure 12:
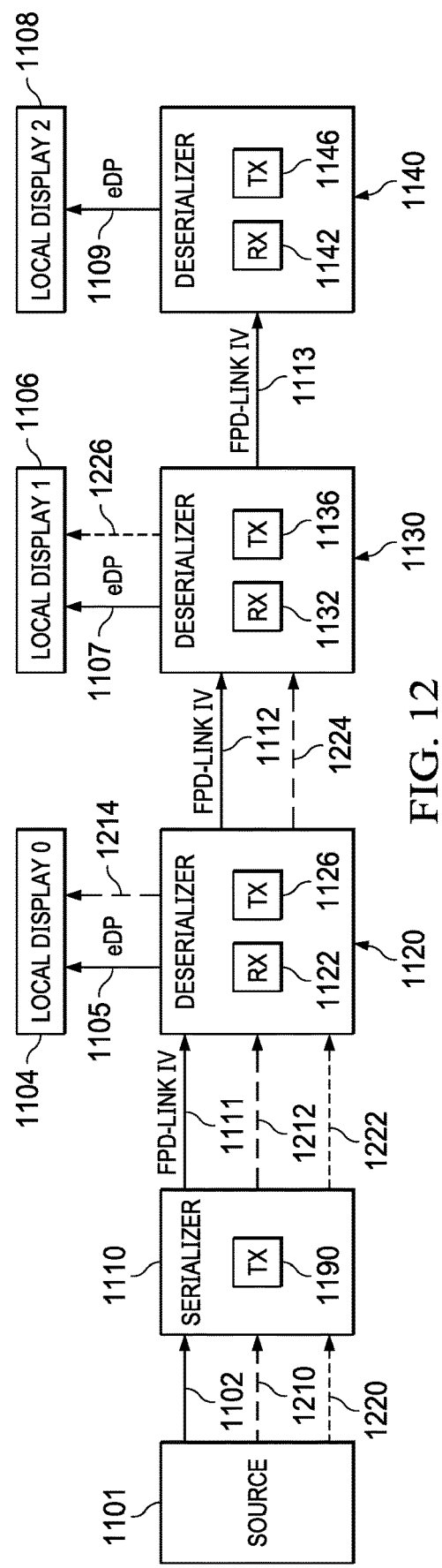
FIG. 12 is a block diagram showing example communications across an example system that includes at least one stream disaggregator adapted to selectively forward communications between serially chained devices.
Figure 15A:
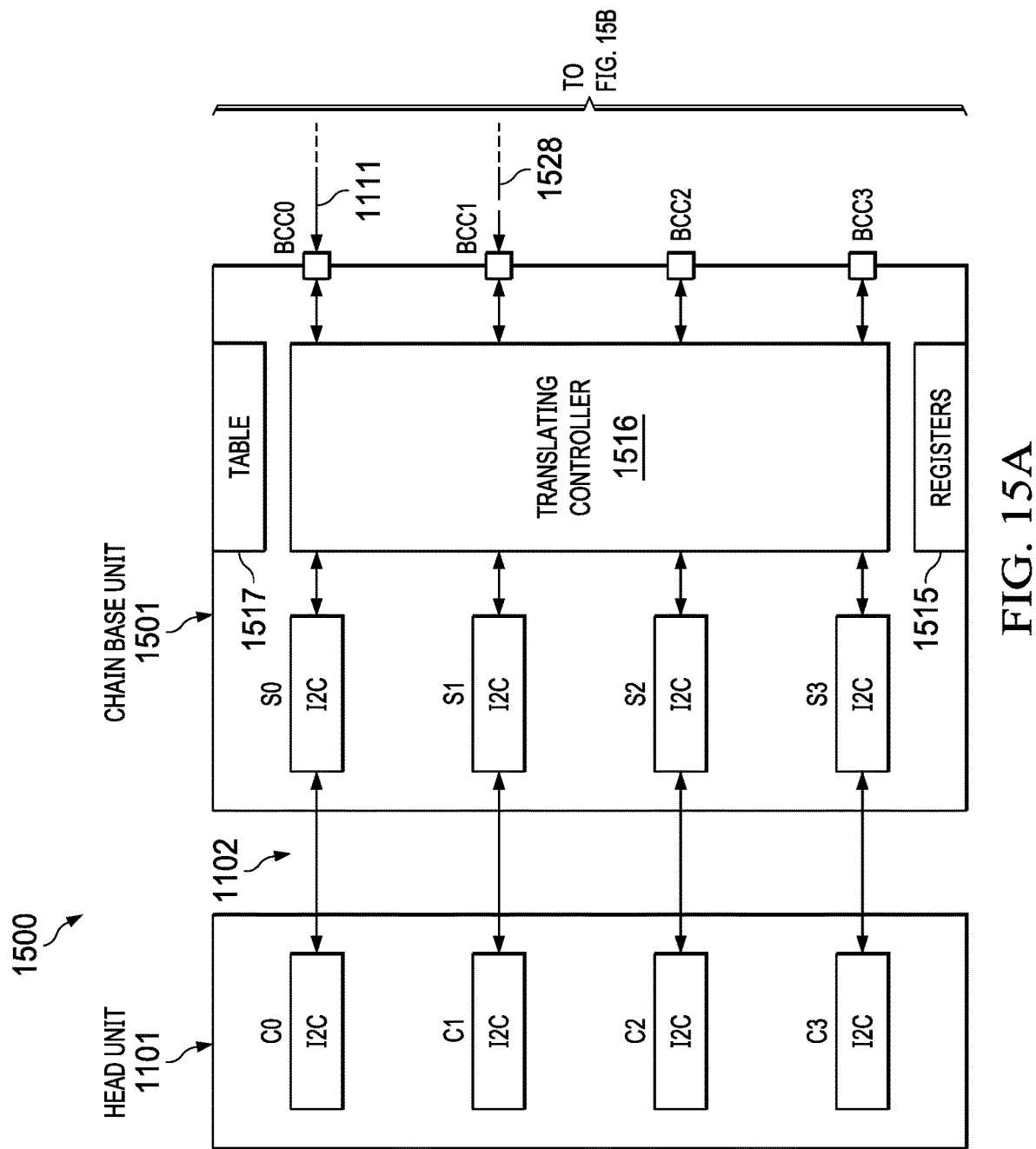
FIG. 15A and FIG. 15B are a block diagram showing associated pairs of virtualized network entities in an example system including at least one translating switch adapted to selectively forward communications between serially chained devices.

FIG. 12 is a block diagram showing example communications across an example system that includes at least one stream disaggregator adapted to selectively forward communications between serially chained devices. For example, the system 1200 is an example system that includes a source 1101 (e.g., a head unit), a serializer 1110 (e.g., a multistream generator coupled to source 1101 via cable 1102), a deserializer 1120 (e.g., a stream disaggregator coupled locally to local display 1104 via cable 1105), a deserializer 1130 (e.g., a stream disaggregator coupled locally to local display 1106 via cable 1107), and a deserializer 1140 (e.g., a stream disaggregator coupled locally to local display 1108 via cable 1109). As shown in FIG. 15A, the cable 1102 includes a separate physical medium for each link (which can be included in a common cable or which can be included in a combination of separate cables).

In the system 1200, a first bidirectional serial link is established between serializer 1110 and deserializer 1120 across cable 1111 (which is coupled between the serializer 1110 and deserializer 1120) and a second bidirectional serial link is established between deserializer 1120. The system 1200 shows an example downstream communication over both the first and second bidirectional serial links.

The first link includes a communication 1210 that is encoded (using a first original protocol) and that is indicated by the source 1101 as being for transmission to the local display 1104. The communication 1210 is sent by the source 1101 via the cable 1102 (e.g., which includes physical media of a first local bus) to the serializer 1110. The serializer 1110 encodes (using a subsequent protocol that is different from the first original protocol) and transmits information from the communication 1210 as communication 1212 via the cable 1111 (which includes physical media of a system bus) to the deserializer 1120. Responsive to the indication that the communication 1210 is for transmission to the local display 1104, the deserializer 1120 encodes (e.g., using the first original protocol) and transmits information from the communication 1212 as communication 1214 via the cable 1105 to the local display 1104.

The second link includes a communication 1220 that is encoded (using a second original protocol) and that is indicated by the source 1101 as being for transmission to the local display 1106. The communication 1220 is sent by the source 1101 via the cable 1102 (e.g., which includes physical media of a second local bus) to the serializer 1110. The serializer 1110 encodes (using the subsequent protocol, which is different from the second original protocol) and transmits information from the communication 1210 as communication 1222 via the cable 1111 (which includes physical media of the system bus) to the deserializer 1120. Responsive to the indication that the communication 1220 is for transmission to the local display 1106, the deserializer 1120 transmits information from the communication 1222 as communication 1224 via the cable 1112 to the deserializer 1130. Responsive to the indication that the communication 1210 is for transmission to the local display 1106, the deserializer 1130 encodes (e.g., using the first original protocol) and transmits information from the communication 1224 as communication 1226 via the cable 1107 to the local display 1106.

In various examples, a system bus (e.g., which include physical media of cables 1111, 1112 and 1113) is configured to bidirectionally (e.g., upstream and downstream) transfer control information. For example, control information (e.g., generated by a head unit or a local display using a local protocol) can be virtualized (e.g., logically switched instead of fixed point-to-point wired routing) by the serializer (e.g., in a downstream direction) or a deserializer (e.g., in an upstream direction) and transmitted across the system bus (e.g., across the system bus in route to an indicated destination) using the system protocol. In an upstream direction, the serializer 1110 converts the control information from the system bus protocol into a local protocol that is compatible with a controller (e.g., master C0 of FIG. 15A) associated with the indicated destination of the control information. In a downstream direction, a deserializer (e.g., 1120, 1130 or 1140) converts the control information from the system bus protocol into a local protocol that is compatible with a respective local display (e.g., local display 1104, 1106 or 1108) associated with the indicated destination of the control information.

In an example, a first link (e.g., which includes communications 1210, 1212 and 1214) is established between a first controller (e.g., network master) included by the source 1101 and a first reciprocal controller (e.g., network slave) included by the local display 1104, and a second link (e.g., which includes communications 1220, 1222, 1224 and 1226) is established between a second controller included by the source 1101 and a reciprocal controller included by the local display 1106. Each controller/reciprocal controller pair can be configured using a master-slave and/or a peer-to-peer relationship.

In the example, a middle portion (e.g., communication 1212 of the first link, and communications 1222 and 1224) are virtualized (e.g., using a different protocol than the beginning and end portions of a respective link) and transmitted in either a downstream direction (e.g., as forward channel data packets) or an upstream direction (e.g., as back channel data packets).

The serializer 1110 serves as (e.g., emulates or virtualizes) a virtual slave with respect to a master included by the source 1101. Further, a deserializer (e.g., 1120) serves as a virtual master with respect to a local slave included by a local device (e.g., 1104) that is locally coupled to the deserializer. (See, for example, FIG. 15A and FIG. 15B.)

For communications transmitted in a downstream direction, the serializer 1110 receives (from the respective master) information that is indicated for transmission to a slave included by a particular device. The serializer 1110 generates (responsive to the information received from the respective master) a system transmission (e.g., which can include packets) that is coupled by a system bus to the deserializer (e.g., deserializer 1120) that is locally coupled to the slave (e.g., that is included by the local display 1104) to which the transmission is indicated. The locally coupled deserializer transmits (in response to the system transmission and the indication of the slave to which the transmission is to be transmitted) a local transmission to the indicated slave, so that (for example) the deserializer emulates the respective master of the source 1101 with respect to the slave (e.g., included by local display 1104) that is coupled locally to the deserializer.

For communications transmitted in an upstream direction, a particular deserializer (e.g., 1120) receives information from the local slave included by the respective locally coupled device (e.g., local display 1104). The particular deserializer generates a system transmission (e.g., which can include packets) in response to the information received from the local slave, where the system transmission indicates the respective master of the local slave. The serializer 1110 receives the system transmission and generates a local transmission that is coupled to the indicated, respective master included by the source 1101, so that (for example) the serializer 1110 emulates the respective slave that is locally coupled to the particular deserializer.

Information to be sent (e.g., coupled) from a master to a respective slave (or from a slave to a respective master) can be encapsulated as a packet in a system transmission. Packets generated by different slaves (for example) can be ordered in time (e.g., by transmitting a packet within a respective timeslot) as described hereinbelow with reference to FIG. 13.

Figure 13:
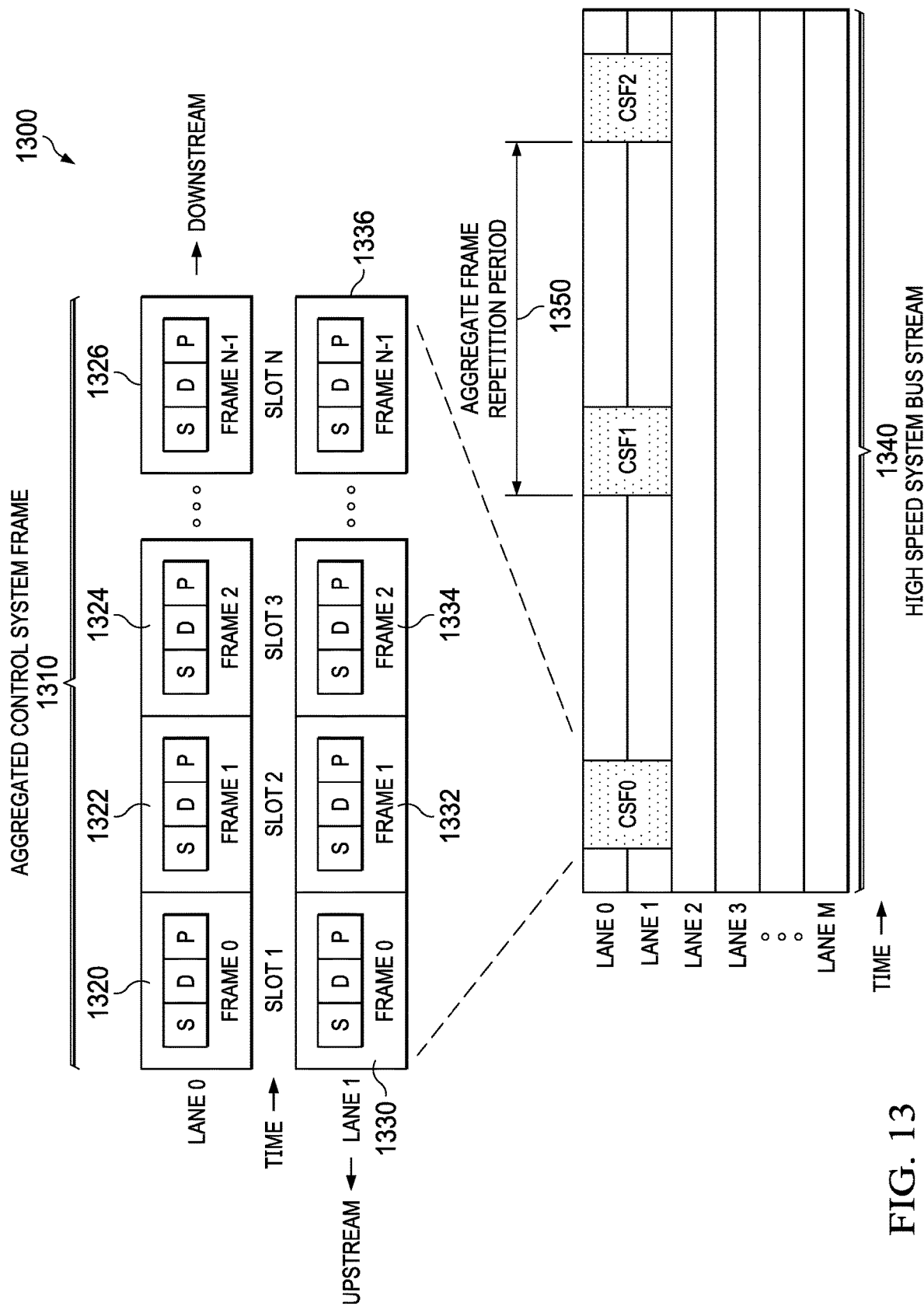
FIG. 13 is a timing diagram showing an example protocol for ordering example communications across an example system that includes at least one stream disaggregator adapted to selectively forward communications between serially chained devices.

FIG. 13 is a timing diagram showing an example protocol for ordering example communications across an example system that includes at least one stream disaggregator adapted to selectively forward communications between serially chained devices. The protocol 1300 is an example protocol of an example system that includes at least one stream disaggregator adapted to selectively forward communications (e.g., packets) between serially chained devices. The communications are selectively forwarded between two entities having a common link (e.g., logical network connection) by which information (including control information) is transmitted and/or exchanged. Such forwarded information can include information generated in response to a user input, information adapted to configure the including system into a particular configuration, menu and user interface information, and status information relative to a performance of a device (e.g., display device).

The protocol 1300 includes an aggregated control system frame 1310, which includes a first set of time-ordered frames (e.g., a downstream frameset starting with frame 1320) to be forwarded in a downstream direction and second set of time-ordered frames (e.g., an upstream frameset starting with frame 1330) to be forwarded in an upstream direction. A frame (e.g., frame 1320) can include one or more packets. In one example, a frame is denoted by which timeslot (e.g., slot) at least one packet appears.

In various examples, the timeslots all have the same duration, so that (for example) a destination of a selected frame can be indicated by the lane (e.g., physical medium) and frame order and/or the time at which the frame is active (e.g., relative to the start of a transmission of the aggregated control system frame 1310).

In at least one example, the control system frame 1310 is transmitted and/or received by the serializer and at least one deserializer at a rate determined in response to an aggregate frame repetition period 1350 (e.g., 16 milliseconds). Generally, the downstream frameset is generated by the serializer and forwarded each aggregate frame period (e.g., CSF0, CSF1 and CSF2) to the next adjacent downstream device in the serial chain of deserializer. For upstream framesets, generally, each serializer is configured to generate a local frame in response to a locally coupled device (e.g., not coupled through the system bus), so that each serializer generates the upstream frameset responsive to the locally generated frame and responsive to a frameset received from a downstream deserializer (which, in turn, can be previously generated responsive to a frame locally generated by the adjacent downstream deserializer and a frame set received from a further downstream deserializer).

In the at least one example, an updated (e.g., changed) frame is propagated upstream or downstream of the high-speed system bus stream 1340 to an adjacent device (e.g., deserializer or serializer) in the serially chained system bus every aggregate frame repetition period 1350. Although two lanes (lane 0 and lane 1) are shown as reserved for the transmission of the aggregated control system frame 1310, additional lanes (e.g., additional pairs of lanes) can be used to increase throughput of, for example, supervisory information (e.g., control, monitoring, maintenance, status, user-interface control object, and configuration information).

In some examples, the destination of a packet within a frame can be determined in response to at least one of a source field "S," a destination field "D" and a payload field "P." In at least one example, the S field is an indication of the source network address, the D field is an indication of the destination network address, and the P field is an aggregation of data (e.g., information) to be forwarded. For example, the P field can include data originally encoded using a local bus protocol (e.g., I2C, GPIO or SPI).

In some examples, a directionality (e.g., upstream or downstream) can be determined in response to the lane in which a frame is transmitted. For example, lane 0 can be reserved for downstream traffic, and lane 1 can be reserved for upstream traffic. A destination for a frame (and at least one packet therein) can be determined in response to the lane directionality, the lane number and/or a time at which a packet is transmitted. A serializer can determine a destination for a frame (in a downstream direction) responsive to a physical medium (e.g., wiring connected from a source network entity to a port of the serializer), so that information from the source network entity can be forwarded to a corresponding (e.g., reciprocal) destination network entity.

The downstream frameset of time-ordered frames in the aggregated control system frame 1310 is transmitted in lane 0 and includes a first frame 1320 in slot 1, a second frame 1322 in slot 2, a third frame 1324 in slot 3, and so on until a last frame 1326 in slot N (where N is the number of slots in a lane of an control system frame 1310). The smaller the number N, the fewer the number of slots and the shorter the propagation time for traversing the entire high-speed system bus.

The upstream frameset of time-ordered frames in the aggregated control system frame 1310 is transmitted in lane 1 and includes a first frame 1330 in slot 1, a second frame 1332 in slot 2, a third frame 1334 in slot 3, and so on until a last frame 1336 in slot N (where N is the number of slots in a lane of an control system frame 1310).

In at least one example, an control system frame 1310 includes information for controlling downstream devices. In one such example, a frame 1320 can be transmitted by the serializer to configure a first display to display a video stream in response to parameters in included in the frame 1320. Lanes of the high-speed system bus stream 1340 that are not reserved at a particular time (e.g., not reserved for the aggregated control system frame 1310) can be used to stream video data to the first display, so that the display can display the video stream in accordance with the parameters included in the frame 1320.

In another such example, a frame 1332 can be transmitted by a deserializer that is locally coupled to a second display. The frame 1332 can be generated in response to a user action received by a user interface of the second display. The frame 1332 is received by the serializer and is routed by the serializer to the network entity (e.g., master) that controls a video stream being sent to the second display. The network entity controlling the display of the video stream on the second display can terminate the video stream responsive to the transmission of the frame 1332, (e.g., which indicates the user intention to stop the display of the video stream). User interactions with a user interface are described hereinbelow with reference to FIG. 14.

Figure 14:
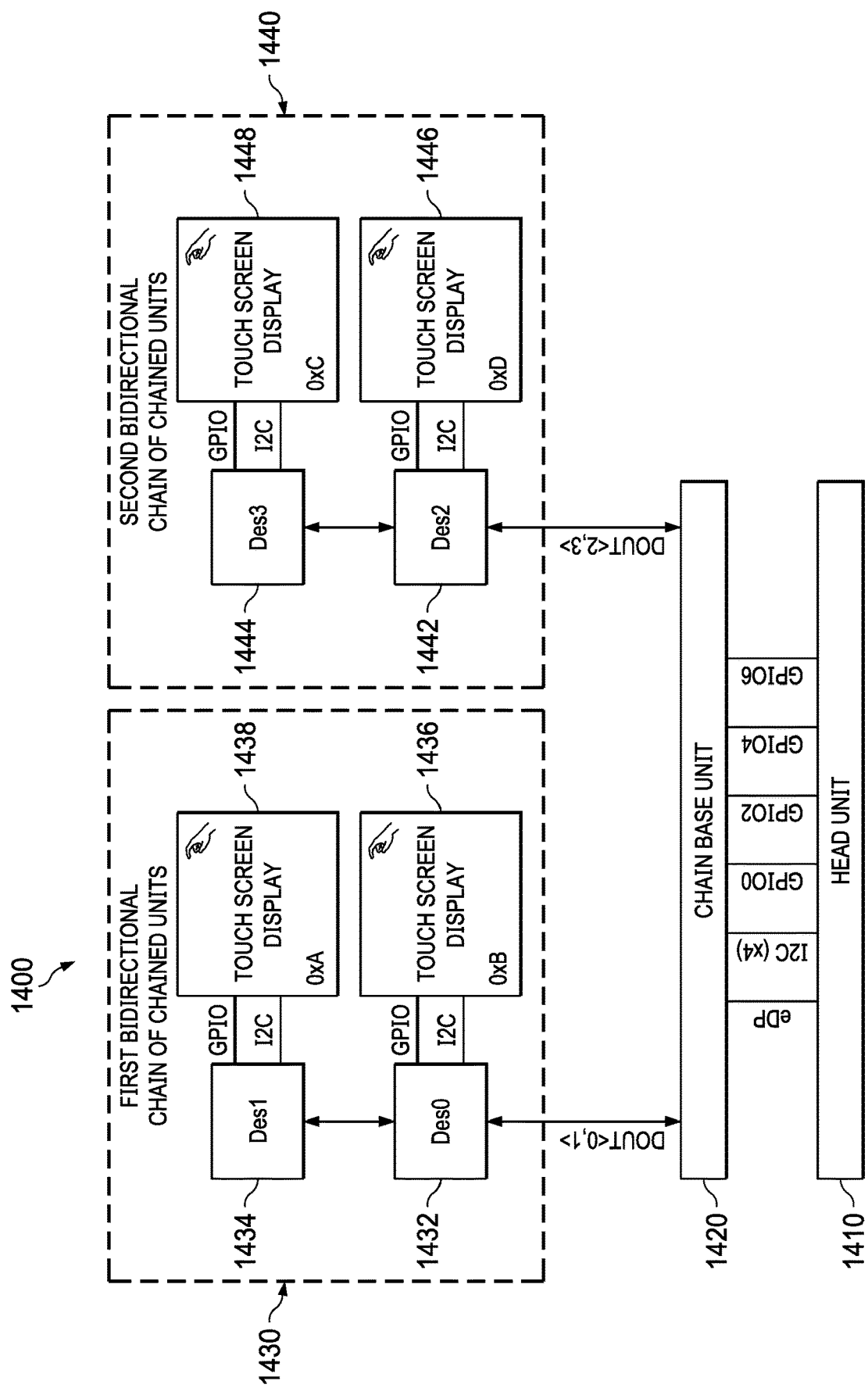
FIG. 14 is a block diagram showing example communications across an example system that includes two chains of serially chained devices.

FIG. 14 is a block diagram showing example communications across an example system that includes two chains of serially chained devices. For example, the system 1400 is an example system that includes a head unit 1410 (e.g., a video stream source unit), a chain base unit 1420 (e.g., a serializer coupled to the head unit 1410), a first bidirectional chain of chained units 1430 and a second bidirectional chain of chained units 1440. The first bidirectional chain of chained units includes a deserializer 1432 (Des0, that is coupled locally to a touch screen display 1436 that has a physical address of 0xB) and a deserializer 1434 (Des1, that is coupled locally to a touch screen display 1438 that has a physical address of 0xA). The second bidirectional chain of chained units includes a deserializer 1442 (Des2, that is coupled locally to a touch screen display 1446 that has a physical address of 0xD) and a deserializer 1444 (Des3, that is coupled locally to a touch screen display 1448 that has a physical address of 0xC).

The head unit 1410 includes multiple network entities (e.g., masters), which are respectively coupled to the chain base unit 1420 via a local bus, where each local bus includes a local bus protocol (such as eDP, I2C and GPIO) that can be the same as or different from the local bus protocols of others of the local buses. As described hereinbelow with reference to FIG. 15A, FIG. 15B, FIG. 16 and FIG. 17, each local bus is associated with a corresponding upstream port (e.g., a port on the upstream side) of the chain base unit 1420.

The chain base unit 1420 can be a serializer configured to generate a multistream (e.g., video multistream) at a first downstream port (e.g., port DOUT<0,1> and a second downstream port DOUT<2,3> on the downstream side of the chain base unit 1420) responsive to video streams received by at least two of the upstream ports of the chain base unit 1420. The first downstream port is the base of the first bidirectional chain of chained units 1430, and the second downstream port is the base of the second bidirectional chain of chained units 1440.

Each deserializer/touch screen display pair can be coupled together using first and second local buses. For example, an I2C bus can be adapted to carry video streaming data into the touch screen display, and a GPIO bus can be adapted to bidirectionally transfer information (e.g., control information, including gestures received by the touch screen display).

Figure 15B:
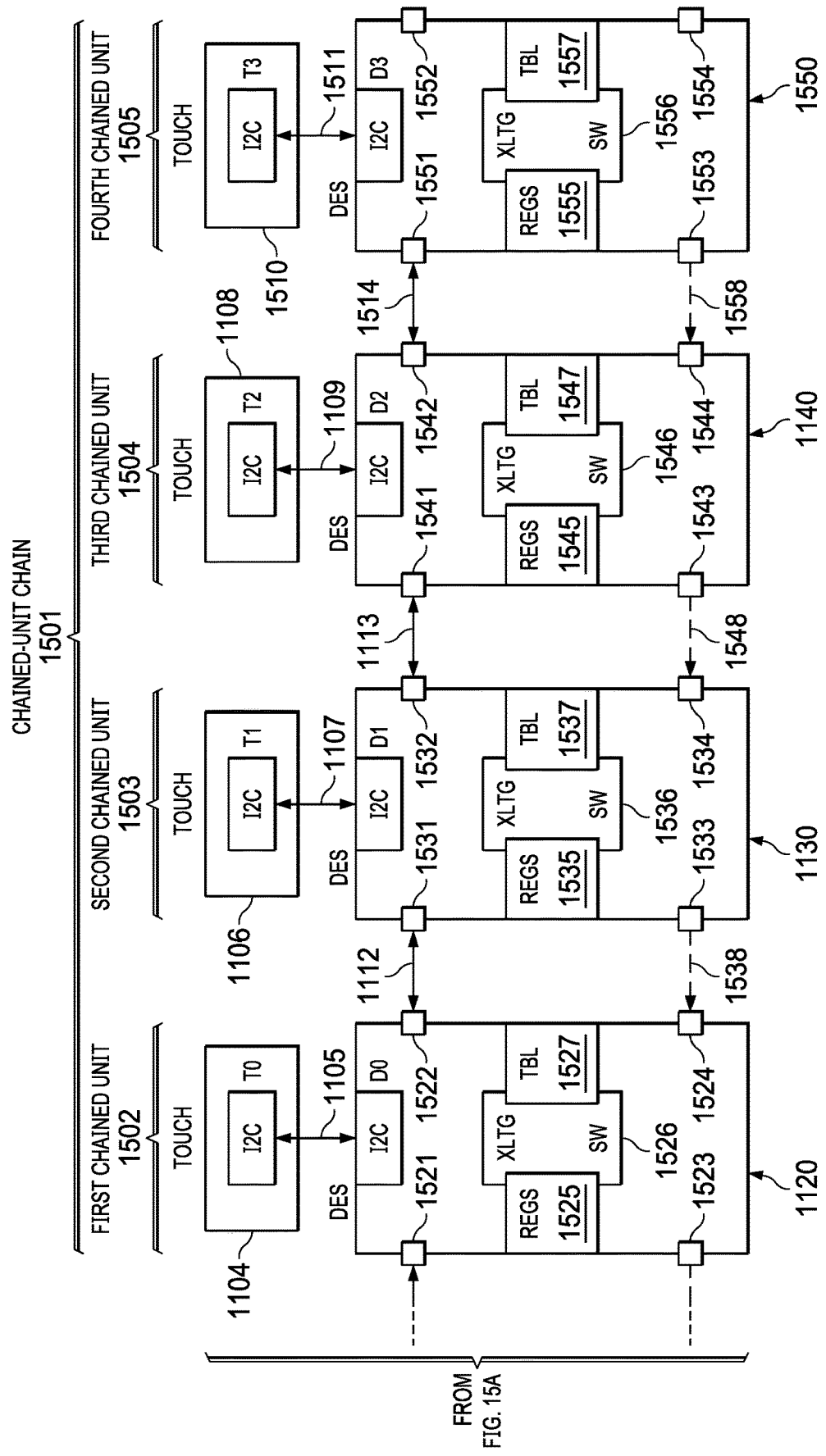

FIG. 15A and FIG. 15B are a block diagram showing associated pairs of virtualized network entities in an example system including at least one translating switch adapted to selectively forward communications between serially chained devices. System 1500 is an example system that includes a source 1101, a chain base unit 1501 (e.g., a serializer 1110), a chained unit 1502 (e.g., which includes a deserializer 1120 coupled locally to local display 1104 via cable 1105), a chained unit 1503 (e.g., which includes a deserializer 1130 coupled locally to local display 1106 via cable 1107), a chained unit 1504 (e.g., which includes a deserializer 1140 coupled locally to local display 1108 via cable 1109), and a chained unit 1505 (e.g., which includes a deserializer 1550 coupled locally to local display 1510 via cable 1511). The chain base unit 1501 and at least a selected one of the deserializers 1120, 1130, 1140, and 1550 is adapted, for example, to virtualize communications coupled via first and second ports (e.g., by routing the communications through a system bus that include deserializers coupled in series by the system bus) to and from local devices (e.g., where each local device is locally coupled to a respective deserializer).

In an example, the source 1101 is a head unit adapted to generate video information for display on the local display 1104, the local display 1106, the local display 1108, and the local display 1510. In the example, the source 1101 is adapted to generate a video stream for each local display responsive to a supervisory communication (e.g., which can include commands) from a respective downstream node (e.g., a local display, where the local display can include a user interface—such as a touch screen—adapted to receive a command from a user). In the example, the supervisory communications are transmitted (e.g., transmitted bidirectionally) through the system bus (e.g., which couples the deserializers in series).

The source 1101 includes four network entities configured respectively as master C0, master C1, master C2 and master C3. In the example, the four network entities are configured to include networking techniques per the I2C protocol. Other examples can include other protocols (such as GPIO).

The chain base unit 1501 includes four network entities configured respectively as slave S0, slave S1, slave S2 and slave S3. Each slave is coupled via a respective physical medium to a respective slave, so that a master and a respective slave is configured in a master-slave relationship (e.g., as a master/slave pair). Each master/slave pair (e.g., one of C0/S0, C1/S1, C2/S2 or C3/S3) is configured to transmit and receive communications therebetween (e.g., point-to-point via a respective twisted pair included by the cable 1102) per a compatible (e.g., common) protocol. Each master is arranged upstream of a respective slave (so that each slave is downstream from a respective master).

The chain base unit 1501 further includes a translating controller 1516. The translating controller 1516 is a translator that includes upstream ports, where each upstream port is adapted to be coupled to a respective slave and to receive a communication (e.g., a frame) from the respective slave. In one example, the translator includes a first upstream port coupled to a first slave, includes a second upstream port coupled to a second slave, and includes an output coupled to a first downstream port that is adapted to be coupled to a first system bus. The translator is adapted to generate a first downstream frame (e.g., to be transmitted in a downstream direction) responsive to a frame received via the first upstream port and is configured to generate a second downstream frame responsive to a frame received via the second upstream port. The translator is configured to generate a downstream aggregate frame responsive to the first downstream frame and the second downstream frame and to initiate transmission of the downstream aggregate frame at the first downstream port.

In the example, the translator is configured to associate a first downstream node and the first downstream frame and to associate a second downstream node and the second downstream frame, so that (for example) a deserializer can correctly switch the first downstream frame to a first downstream node (e.g., a respective downstream node) and correctly switch the second downstream frame to a second downstream node (e.g., a respective downstream node that is different from the first downstream node). In various examples, the first downstream node is associated with the first downstream frame by an address of the first downstream node included in the first downstream frame. In various examples, the first downstream node is associated with the first downstream frame by an order of transmission of the first downstream frame within the downstream aggregate frame.

The translator is adapted to receive an upstream aggregate frame that includes a first upstream frame and a second upstream frame. The first upstream frame can be generated responsive to the first downstream node (e.g., responsive to a transmission from the first downstream node) and the second upstream frame can be generated responsive to the second downstream node, where the first upstream frame and the second upstream frame can be transmitted in tandem as a portion of the upstream aggregate frame. The translator is further configured to generate a first upstream transmission responsive to the first upstream frame (e.g., where the first upstream transmission cam be transmitted via the first upstream port to the first master), and the translator is configured to generate a second upstream transmission responsive to the second upstream frame (e.g., where the second upstream transmission can be transmitted via the second upstream port to the second master).

The chain base unit 1501 further includes downstream ports, such as downstream port BCC0, downstream port BCC1, downstream port BCC2 and downstream port BCC3. In one example the downstream port is coupled to a first system bus via cable 1111, and the downstream port BCC1 is coupled to a second system bus via cable 1528. In at least one example, a same physical device can be simultaneously coupled to the first system bus and the second system bus, where a first network connection with a first slave of the same physical device is established across a portion of the first system bus and a second network connection with a second slave of the same physical device is established across a portion of the second system bus.

The chain base unit 1501 further includes registers 1515, which in at least one example can be programmed to indicate a system configuration, For example, the registers 1515 can be programmed to store an indication of the system configuration to indicate a type of protocols used by each network connection, selected bus speeds, and the numbers and types and physical locations (e.g., addresses) of devices coupled to one or more system buses.

The chain base unit 1501 further includes a table 1517, which in at least one example can be programmed with translation values to associate physical devices for virtualization. For example, the translation values can indicate associations between (and amongst) virtual connections, paired network entities, frame ordering of upstream and downstream aggregate frames, and device-specific protocol translation (e.g., conversion of data and/or commands to and from an arbitrary device).

The downstream port BCC0 is a base (e.g., upstream end) of the first system bus that chains (e.g., serially couples) the chained units of chained-unit chain 1510. An upstream port 1521 of the chained unit 1502 is coupled to the downstream port BCC0 via the cable 1111, an upstream port 1531 of the chained unit 1503 is coupled to the downstream port 1522 (of the chained unit 1502) via the cable 1112, an upstream port 1541 of the chained unit 1504 is coupled to the downstream port 1532 (of the chained unit 1503) via the cable 1113, and an upstream port 1551 of the chained unit 1505 is coupled to the downstream port 1542 (of the chained unit 1504) via the cable 1115. The first system bus extends from the downstream port BCC0 and is serially chained (e.g., daisy-chained) through the chained unit 1502, the chained unit 1503, the chained unit 1504, and the chained unit 1505. The first system bus can be extended (e.g., extended downstream) by coupling an additional chained unit (not shown) to the downstream port 1552 of the chained unit 1505.

In at least one example, the first system bus is a bidirectional bus in which data is transmitted at a higher rate in the downstream direction, and in which data is transmitted at a lower rate in the upstream direction.

In at least one example, the system 1500 includes (e.g., optionally includes) a second system bus that is configured to transmit (e.g., unidirectionally transmit) data in an upstream direction, and where the first system bus is configured to transmit (e.g., unidirectionally transmit) data in a downstream direction. The downstream port BCC1 is a base (e.g., upstream end) of the second system bus that chains (e.g., serially couples) the chained units of chained-unit chain 1510. An upstream port 1523 of the chained unit 1502 is coupled to the downstream port BCC1 via the cable 1528, an upstream port 1533 of the chained unit 1503 is coupled to the downstream port 1524 (of the chained unit 1502) via the cable 1538, an upstream port 1543 of the chained unit 1504 is coupled to the downstream port 1534 (of the chained unit 1503) via the cable 1548, and an upstream port 1553 of the chained unit 1505 is coupled to the downstream port 1544 (of the chained unit 1504) via the cable 1558. The second system bus extends from the downstream port BCC1 and is serially chained (e.g., daisy-chained) through the chained unit 1502, the chained unit 1503, the chained unit 1504, and the chained unit 1505. The second system bus can be extended (e.g., extended downstream) by coupling an additional chained unit (not shown) to the downstream port 1554 of the chained unit 1505.

The chained unit 1502 includes the local display 1104 and the deserializer 1120. The local display 1104 includes a slave T0 that is locally coupled via cable 1105 to a master D0 that is included by the deserializer 1120. A network connection is established (e.g., using the I2C protocol) between the deserializer 1120 (which is configured as a master D0 with respect to the local display 1104) and the local display (which is configured as a slave T0 with respect to the deserializer 1120). The chained unit 1502 further includes registers 1525 (e.g., REGS, configured to store configuration information), a translating switch 1526 (e.g., XLTG SW, configured to selectively switch communications that are indicated to be associated with the local display 1104), and a table 1527 (e.g., TBL, configured to store virtualization information, such as base addresses, indexes and other indicators used in address indirection and virtualization techniques). The translating switch 1526 is configured to selectively couple communications between an upstream master/slave pair (e.g., C0/S0) and a downstream master/slave pair (e.g., D0/T0), so that the downstream slave (e.g., slave T0) is configured as a virtual slave (e.g., with respect to the upstream slave S0), and so that the downstream master (e.g., master D0) is configured as a virtual master (e.g., with respect to the master C0).

The chained unit 1503 includes the local display 1106 and the deserializer 1130. The local display 1106 includes a slave T1 that is locally coupled via cable 1107 to a master D1 that is included by the deserializer 1130. A network connection is established between the deserializer 1130 (which is configured as a master D1 with respect to the local display 1106) and the local display (which is configured as a slave T1 with respect to the deserializer 1130). The chained unit 1503 further includes registers 1535, a translating switch 1536, and a table 1537. The translating switch 1536 is configured to selectively couple communications between an upstream master/slave pair (e.g., C1/S1) and a downstream master/slave pair (e.g., D1/T1), so that the downstream slave (e.g., slave T1) is configured as a virtual slave (e.g., with respect to the upstream slave S1), and so that the downstream master (e.g., master D1) is configured as a virtual master (e.g., with respect to the master C0.

The chained unit 1504 includes the local display 1108 and the deserializer 1140. The local display 1108 includes a slave T2 that is locally coupled via cable 1109 to a master D2 that is included by the deserializer 1140. A network connection is established between the deserializer 1140 (which is configured as a master D2 with respect to the local display 1108) and the local display (which is configured as a slave T2 with respect to the deserializer 1140). The chained unit 1504 further includes registers 1545, a translating switch 1546, and a table 1547. The translating switch 1546 is configured to selectively couple communications between an upstream master/slave pair (e.g., C2/S2) and a downstream master/slave pair (e.g., D2/T2), so that the downstream slave (e.g., slave T2) is configured as a virtual slave (e.g., with respect to the upstream slave S2), and so that the downstream master (e.g., master D2) is configured as a virtual master (e.g., with respect to the master C2).

The chained unit 1505 includes the local display 1510 and the deserializer 1550. The local display 1510 includes a slave T3 that is locally coupled via cable 1511 to a master D3 that is included by the deserializer 1550. A network connection is established between the deserializer 1550 (which is configured as a master D3 with respect to the local display 1108) and the local display (which is configured as a slave T3 with respect to the deserializer 1550). The chained unit 1505 further includes registers 1555, a translating switch 1556, and a table 1557. The translating switch 1556 is configured to selectively couple communications between an upstream master/slave pair (e.g., C3/S3) and a downstream master/slave pair (e.g., D3/T3), so that the downstream slave (e.g., slave T3) is configured as a virtual slave (e.g., with respect to the upstream slave S3), and so that the downstream master (e.g., master D3) is configured as a virtual master (e.g., with respect to the master C3).

Figure 16:
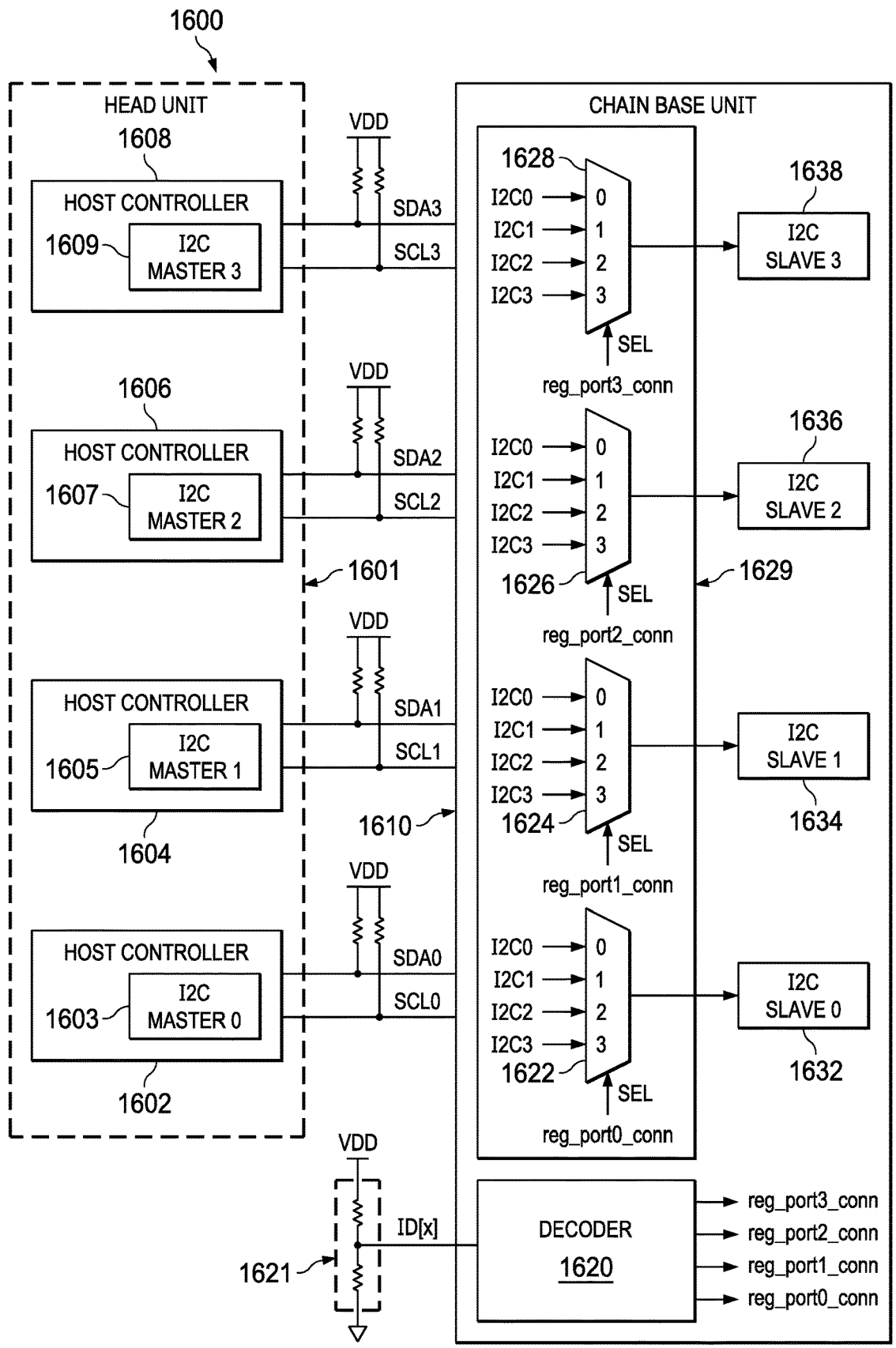
FIG. 16 is a schematic diagram showing external selection of associated pairs of virtualized network entities in an example system adapted to selectively forward communications to serially chained devices.

FIG. 16 is a schematic diagram showing external selection of associated pairs of virtualized network entities in an example system adapted to selectively forward communications to serially chained devices. System 1600 is an example system that includes a head unit 1601 and a chain base unit 1610 (e.g., a serializer 1110).

In an example, the head unit 1601 is adapted to generate video information for display on various local displays (e.g., local display 1104, the local display 1106, and the local display 1108). The local displays are local with respect to a respective deserializer rather than being "local" with respect to the head unit 1601, for example. The local displays are virtualized by a system bus that is coupled to replicate local communications between a local host controller (e.g., included by the head unit 1601) and a respective slave (e.g., included by the chain base unit 1610).

In the example, the head unit 1601 includes a host controller 1602 that includes a master 1603 (I2C master 0), a host controller 1604 that includes a master 1605 (I2C master 1), a host controller 1606 that includes a master 1607 (I2C master 2), and a host controller 1608 that includes a master 1609 (I2C master 3). Each host controller and respective master is coupled to the chain base unit 1610 by a respective serial bus, where each line of the serial bus can be coupled via an open-drain transistor adapted to generate an output voltage in cooperation with a respective pull-up resistor.

The I2C bus coupled to the master 1603 includes a data line (SDA0) and a clock line (SCL0), where the lines are collectively shown as I2C0 within the chain base unit 1610. The I2C bus coupled to the master 1605 includes a data line (SDA1) and a clock line (SCL1), where the lines are collectively shown as I2C1 within the chain base unit 1610. The I2C bus coupled to the master 1607 includes a data line (SDA2) and a clock line (SCL2), where the lines are collectively shown as I2C2 within the chain base unit 1610. The I2C bus coupled to the master 1609 includes a data line (SDA3) and a clock line (SCL3) where the lines are collectively shown as I2C3 within the chain base unit 1610.

The chain base unit 1610 further includes a multiple-input/multiple-output (MIMO) switch 1629 that is configured to associate (e.g., responsive to external voltage divider 1621) any master of the head unit 1601 with any slave of the chain base unit 1610. For example, the MIMO switch includes a multiplexer 1622, a multiplexer 1624, a multiplexer 1626 and a multiplexer 1628. The multiplexer 1622 is coupled to inputs I2C0, I2C1, I2C2 and I2C3 and is configured to selectively a selected one of the inputs (responsive to the signal reg_port0_conn) to the slave 1632 (I2C slave 0). The multiplexer 1624 is coupled to inputs I2C0, I2C1, I2C2 and I2C3 and is configured to selectively a selected one of the inputs (responsive to the signal reg_port1_conn) to the slave 1634 (I2C slave 2). The multiplexer 1626 is coupled to inputs I2C0, I2C1, I2C2 and I2C3 and is configured to selectively a selected one of the inputs (responsive to the signal reg_port2_conn) to the slave 1634 (I2C slave 2). The multiplexer 1628 is coupled to inputs I2C0, I2C1, I2C2 and I2C3 and is configured to selectively a selected one of the inputs (responsive to the signal reg_port3_conn) to the slave 1638 (I2C slave 3).

The chain base unit 1610 includes a decoder 1620 that is configured to program a selection of each multiplexer, so that the respective slave coupled to the output of a multiplexer is coupled to a selected master of the head unit 1601. The decoder is responsive to an input-decoder voltage (ID[x]) to output selection values of the reg_port0_conn, the reg_port1_conn, the reg_port2_conn and the reg_port3_conn signals. The voltage divider 1621 can be external to the semiconductor substrate that includes the system 1600, so that the input-decoder voltage can be generated responsive to external transistors selected and installed by a system integrator (for example). The decoder 1620 can include an analog-to-digital converter (not shown) and a preprogrammed lookup table (not shown), so that a value output by the analog-to-digital converter is coupled as an input to the lookup table, which is configured to output a selected set of selection values, so that each slave is selectively coupled to a respective master (and vice versa) in response to a user selection for configuration of the system 1600.

Figure 17A:
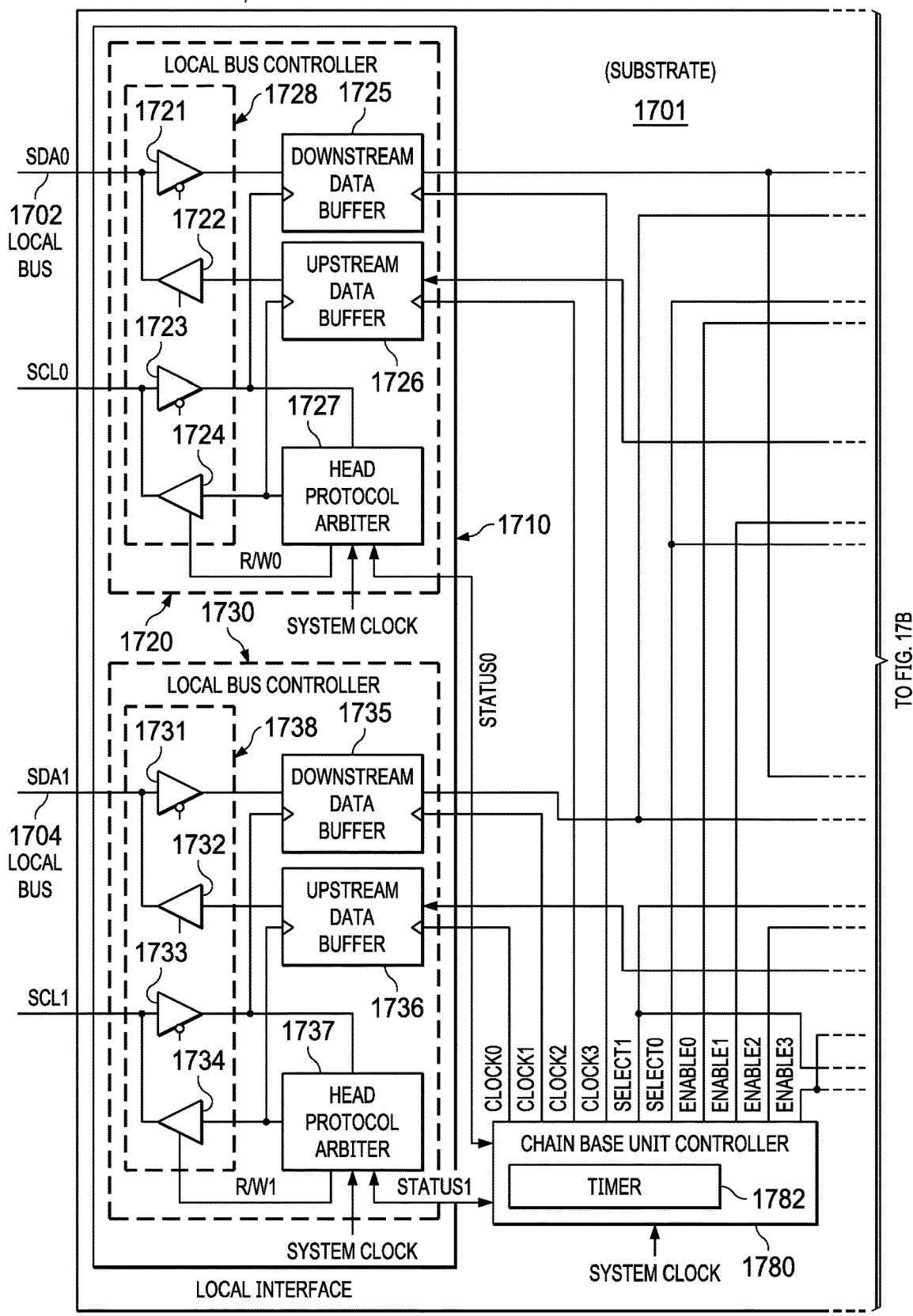
FIG. 17A and FIG. 17B are a schematic diagram showing a serializer configured to associate pairs of virtualized network entities in an example system adapted to selectively forward communications between serially chained devices.
Figure 17B:
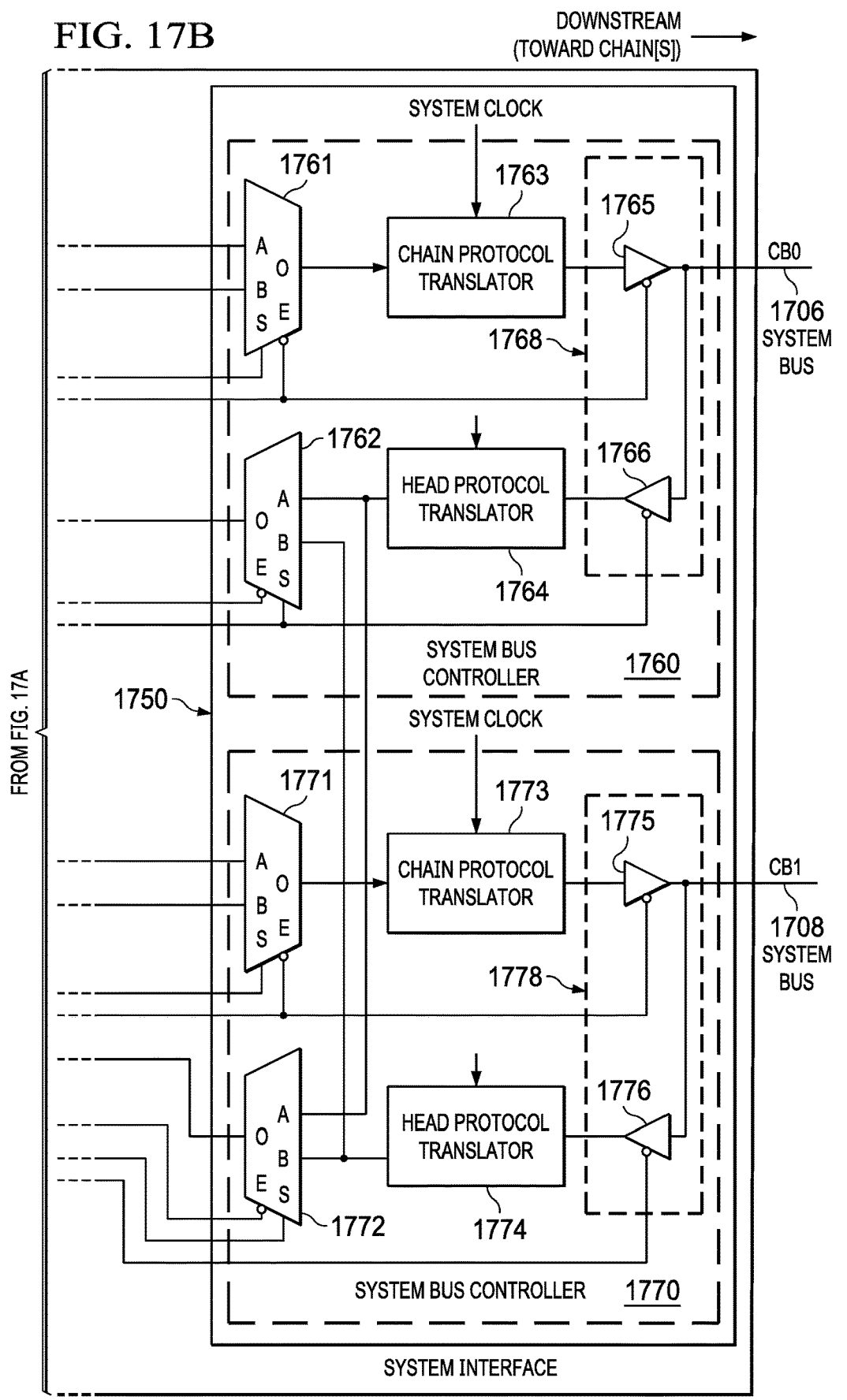

FIG. 17A and FIG. 17B are a schematic diagram showing a serializer configured to associate pairs of virtualized network entities in an example system adapted to selectively forward communications between serially chained devices. The serializer 1700 is an example serializer that includes a substrate 1701 (e.g., a semiconductor substrate or a printed wiring board substrate), a local interface 1710 (e.g., configured to manage local upstream communications in accordance with a local bus 1702 and a local bus 1704), a system interface 1750 (e.g., configured to manage system downstream communications in accordance with at least one of a system bus 1706 and a system bus 1708), and a chain base unit controller 1780 (e.g., configured to control communications between the local interface 1710 and the system interface 1750).

The local interface 1710 includes a local bus controller 1720 and a local bus controller 1730. More such local bus controllers can be included by the local interface 1710, where each included local bus controller can be configured as a network entity of a respective local bus coupled to a local bus controller.

The local bus controller 1720 includes a downstream data buffer 1725, and upstream data buffer 1726, a head protocol arbiter 1727, and an upstream port 1728. The upstream port 1728 includes a tristate driver 1721 (e.g., coupled to selectably couple signal line SDA0 to an input of the downstream data buffer 1725), a tristate driver 1722 (e.g., coupled to selectably couple an output of the upstream data buffer 1726 to the signal line SDA0), a tristate driver 1723 (e.g., coupled to selectably couple signal line SCL0 to an input of the head protocol arbiter 1727), and a tristate driver 1724 (e.g., coupled to selectably couple an output of the head protocol arbiter 1727 to the signal line SCL0). The upstream port 1728 is configured to transmit responsive to a first value of signal R/W0 and the upstream port 1728 is configured to receive responsive to a second value of signal R/W0.

The downstream data buffer 1725 is configured to store data of a downstream transmission received via the signal line SDA0 responsive to a clock received via the signal line SCL0. The downstream data buffer 1725 is configured to output data stored therein responsive to a clock received from the chain base unit controller 1780 via the signal line CLOCK3.

The upstream data buffer 1726 is adapted to store data indicated by an upstream transmission received from a downstream node, where the upstream transmission includes a first frame of an upstream aggregate frame, and wherein the stored data is stored responsive to a clock received from the chain base unit controller 1780 via the signal line CLOCK2. The upstream data buffer 1726 is configured to output data stored therein responsive to a clock received from head protocol arbiter 1727.

The head protocol arbiter 1727 is configured to control a directionality (e.g., upstream or downstream data flow) of the upstream port 1728 responsive to one of a local bus 1702 signal (e.g., signal SCL0), a system clock (including a signal derived responsive to the system clock) and a mode control line (e.g., received via the signal line STATUS0).

In an example, the local bus controller 1720 is a first local controller having a first upstream port adapted to be coupled to a first local bus and adapted to receive a first local bus transmission via the first local bus, and the first local controller configured to transmit a first upstream transmission via the first upstream port.

The local bus controller 1730 includes a downstream data buffer 1735, and upstream data buffer 1736, a head protocol arbiter 1737, and an upstream port 1738. The upstream port 1738 includes a tristate driver 1731 (e.g., coupled to selectably couple signal line SDA1 to an input of the downstream data buffer 1735), a tristate driver 1732 (e.g., coupled to selectably couple an output of the upstream data buffer 1736 to the signal line SDA1), a tristate driver 1733 (e.g., coupled to selectably couple signal line SCL1 to an input of the head protocol arbiter 1737), and a tristate driver 1734 (e.g., coupled to selectably couple an output of the head protocol arbiter 1737 to the signal line SCL1). The upstream port 1738 is configured to transmit responsive to a first value of signal R/W1 and the upstream port 1738 is configured to receive responsive to a second value of signal R/W1.

The downstream data buffer 1735 is configured to store data of a downstream transmission received via the signal line SDA1 responsive to a clock received via the signal line SCL0. The downstream data buffer 1735 is configured to output data stored therein responsive to a clock received from the chain base unit controller 1780 via the signal line CLOCK1.

The upstream data buffer 1736 is adapted to store data indicated by an upstream transmission received from a downstream node, where the upstream transmission includes a second frame of an upstream aggregate frame, and wherein the stored data is stored responsive to a clock received from the chain base unit controller 1780 via the signal line CLOCK0. The upstream data buffer 1736 is configured to output data stored therein responsive to a clock received from head protocol arbiter 1737.

The head protocol arbiter 1737 is configured to control a directionality (e.g., upstream or downstream data flow) of the upstream port 1738 responsive to one of a local bus 1704 signal (e.g., signal SCL1), a system clock (including a signal derived responsive to the system clock) and a mode control line (e.g., received via the signal line STATUS1).

In an example, the local bus controller 1730 is a second local controller having a second upstream port adapted to be coupled to a second local bus and adapted to receive a second local bus transmission via the second local bus, and the second local controller configured to transmit a second upstream transmission via the second upstream port.

The example can further include a first buffer having an input coupled to the first upstream port and an output coupled to the downstream port, where the first buffer is configured to store a first indication of data (e.g., a data payload) responsive to the first local bus transmission, wherein the system bus controller is configured to generate the first downstream frame responsive to the first indication of data.

The example can further include a second buffer having an input coupled to the second upstream port and an output coupled to the downstream port, where the second buffer is configured to store a second indication of data responsive to the first local bus transmission, wherein the system bus controller is configured to generate the first downstream frame responsive to the second indication of data.

The example can further include a third buffer having an input coupled to the downstream port and an output coupled to the first upstream port, where the third buffer is configured to generate a third indication of data, wherein the system bus controller is configured to generate the first upstream transmission responsive to the third indication of data.

The example can further include a fourth buffer having an input coupled to the downstream port and an output coupled to the second upstream port, where the fourth buffer is configured to generate a fourth indication of data responsive to the second upstream frame, wherein the system bus controller is configured to generate the second upstream transmission responsive to the fourth indication of data.

The system interface 1750 includes a system bus controller 1760 and an optional system bus controller 1770. More (or less) such system bus controllers can be included by the system interface 1750. The system bus controller 1760 is adapted to control a first system bus such as system bus 1706. In one example, the system bus 1706 can include one or more twisted pairs CB0, which are coupled to the output of the tristate driver 1765 and the input of the tristate driver 1766. Where multiple twisted pairs CB0 exist, the components of the system bus controller can be instantiated multiple times, so that (for example) a pair of drivers (e.g., tristate driver 1765 and tristate driver 1766) exists for each lane of the system bus 1706.

The system bus controller 1760 includes an input multiplexer 1761, an output multiplexer 1762, a chain protocol translator 1763, a head protocol translator 1764, and a downstream port 1768 (which includes a tristate driver 1765 and a tristate driver 1766).

The input multiplexer 1761 includes an input A (e.g., coupled to a data output of the downstream data buffer 1725), an input B (e.g., coupled to a data output of the downstream data buffer 1735), an input S (e.g., coupled to an output SELECT0 of the chain base unit controller 1780), an input E (e.g., coupled to an output ENABLE0 of the chain base unit controller 1780), and an output O (e.g., coupled to an input of the chain protocol translator 1763). The input multiplexer 1761 is coupled to select input A or input B responsive to a frame selector (e.g., timer 1782, which is included by the chain base unit controller 1780), so that (for example) data from either the local bus controller 1720 or the local bus controller 1730 can be transmitted in a timeslot associated with an ordinality of a frame indicated to be transmitted to a respective downstream node (e.g., where the respective downstream node is adapted to be coupled to the chain protocol translator 1763 via the downstream port 1768).

The chain protocol translator 1763 includes a data input (coupled to the output O of the input multiplexer 1761), a system clock input (coupled to receive a system clock or derivative thereof), and a data output (e.g., coupled to an input of the downstream port 1768). In at least one example, the chain protocol translator 1763 is configured to output data in accordance with a protocol of a system bus 1706.

In one example, the chain protocol translator 1763 is a translator having an input coupled to the first upstream port and the second upstream port and an output coupled to the downstream port, where the translator is configured to associate a first downstream node and the first downstream frame and to associate a second downstream node and the second downstream frame.

In at least one such example, the first downstream node is associated with the first downstream frame by an address of the first downstream node included in the first downstream frame. In at least one such example, the first downstream node is associated with the first downstream frame by an order of transmission of the first downstream frame within the downstream aggregate frame.

The example can include the first downstream node and the second downstream node, the first downstream node coupled to the downstream port, the second downstream node coupled to the first downstream node, where the first downstream node is coupled between the downstream port and the second downstream node.

The head protocol translator 1764 includes a data input (e.g., coupled to an output of the downstream port 1768, such as the output of the tristate driver 1766), a system clock input (e.g., coupled to receive a system clock or a derivative thereof), and a data output (e.g., coupled to a selected input of one of the upstream data buffer 1726 and the upstream data buffer 1736). In at least one example, the head protocol translator is configured to translate data encoded in a system bus protocol (e.g., data received from the system bus 1706) to data encoded in a local bus protocol (e.g., data transmitted via the local bus 1702 or the local bus 1704).

The output multiplexer 1762 includes an input A (e.g., coupled to a data output of the head protocol translator 1764), an input B (e.g., coupled to a data output of the head protocol translator 1774), an input S (e.g., coupled to an output SELECT0 of the chain base unit controller 1780), an input E (e.g., coupled to an output ENABLE1 of the chain base unit controller 1780), and an output O (e.g., coupled to an input of the upstream data buffer 1726 and to an input of the upstream data buffer 1736, where data indicated by a first upstream frame can be selectively clocked into the upstream data buffer 1726 responsive to the CLOCK2 line, and where data indicated by a second upstream frame can be selectively clocked into the upstream data buffer 1736 responsive to the CLOCK0 line). The output multiplexer 1762 is coupled to select one of the input A or input B responsive to a frame selector (e.g., timer 1782, which is included by the chain base unit controller 1780). The output multiplexer 1762 selection includes a switching of data responsive to an indication of an address. In one example, the indication of an address can be a timeslot ordering associated with the downstream node associated with an instant upstream frame (e.g., one of the first upstream frame and the second upstream frame). The switching of data via the output multiplexer 1762 selection can include (for example) switching of data to a local bus controller that is associated with the instant upstream frame (e.g., either the local bus controller 1720 or the local bus controller 1730).

In an example, the system bus controller 1760 is a system bus controller having a downstream port adapted to be coupled to a system bus, the system bus controller configured to generate a first downstream frame responsive to the first local bus transmission, the system bus controller configured to generate a second downstream frame responsive to the second local bus transmission, the system bus controller configured to generate a downstream aggregate frame responsive to the first downstream frame and the second downstream frame, the system bus controller configured to initiate transmission of the downstream aggregate frame at the downstream port, the system bus controller adapted to receive an upstream aggregate frame that includes a first upstream frame and a second upstream frame, the system bus controller configured to generate the first upstream transmission responsive to the first upstream frame, and the system bus controller configured to generate the second upstream transmission responsive to the second upstream frame.

The example can further include a substrate, where the first local controller, the second local controller, and the system bus controller are arranged on the substrate. In at least one such example, the substrate is a monolithic semiconductor substrate, and the first local controller, the second local controller, and the system bus controller are formed on the substrate.

The example can further include a translator (such as the head protocol translator 1764) where the translator includes an input coupled to the downstream port and an output selectively coupled to one of the first upstream port and the second upstream port, where the output of the translator is selected responsive to an indication of an association between a selected downstream node and a respective upstream frame of the upstream aggregate frame.

In one such example, the association between of the selected downstream node and the respective upstream frame of the upstream aggregate frame is indicated by an address included in the upstream aggregate frame. In one such example, the association between of the selected downstream node and the respective upstream frame of the upstream aggregate frame is indicated by a time of reception by the downstream port of the respective upstream frame.

In an example described herein below, the system bus controller can be a first system bus controller, the system bus can be a first system bus, the downstream aggregate frame can be a first downstream aggregate frame, the upstream aggregate frame can be a first upstream aggregate frame, the downstream port can be a first downstream port, where the example includes a second system bus controller having a second downstream port adapted to be coupled to a second system bus, where the system bus controller is configured to generate a third downstream frame responsive to a third local bus transmission, where the system bus controller is configured to generate a fourth downstream frame responsive to a fourth local bus transmission, where the system bus controller is configured to generate a second downstream aggregate frame responsive to the third downstream frame and the fourth downstream frame, where the system bus controller is configured to initiate transmission of the second downstream aggregate frame at the second downstream port, where the system bus controller is adapted to receive a second upstream aggregate frame that includes a third upstream frame and a fourth upstream frame, where the system bus controller is configured to initiate a transmission of—at a third upstream port—a third upstream transmission responsive to the third upstream frame, and where the system bus controller is configured to initiate transmission of—at a fourth upstream port—a fourth upstream transmission responsive to the fourth upstream frame.

The system bus controller 1770 is an optional system bus controller that includes an input multiplexer 1771, an output multiplexer 1772, a chain protocol translator 1773, a head protocol translator 1774, and a downstream port 1778 (which includes a tristate driver 1775 and a tristate driver 1776). The system bus controller 1770 is adapted to control a second system bus such as system bus 1708. In one example, the system bus 1708 can include one or more twisted pairs CB1, which are coupled to the output of the tristate driver 1775 and the input of the tristate driver 1776. Where multiple twisted pairs CB1 exist, the components of the system bus controller can be instantiated multiple times, so that (for example) a pair of tristate drivers (e.g., tristate driver 1775 and tristate driver 1776) exists for each lane of the system bus 1708.

The input multiplexer 1771 includes an input A (e.g., coupled to a data output of the downstream data buffer 1725), an input B (e.g., coupled to a data output of the downstream data buffer 1735), an input S (e.g., coupled to an output SELECT1 of the chain base unit controller 1780), an input E (e.g., coupled to an output ENABLE2 of the chain base unit controller 1780), and an output O (e.g., coupled to an input of the chain protocol translator 1773). The input multiplexer 1771 is coupled to select input A or input B responsive to a frame selector (e.g., timer 1782, which is included by the chain base unit controller 1780), so that (for example) data from either the local bus controller 1720 or the local bus controller 1730 can be transmitted in a timeslot associated with an ordinality of a frame indicated to be transmitted to a respective downstream node (e.g., where the respective downstream node is adapted to be coupled to the chain protocol translator 1773 via the downstream port 1778).

The chain protocol translator 1773 includes a data input (coupled to the output O of the input multiplexer 1771), a system clock input (coupled to receive a system clock or derivative thereof), and a data output (e.g., coupled to an input of the downstream port 1778). In at least one example, the chain protocol translator 1773 is configured to output data in accordance with a protocol of system bus 1708.

The head protocol translator 1774 includes a data input (e.g., coupled to an output of the downstream port 1778, such as the output of the tristate driver 1776), a system clock input (e.g., coupled to receive a system clock or a derivative thereof), and a data output (e.g., coupled to a selected input of one of the upstream data buffer 1726 and the upstream data buffer 1736). In at least one example, the head protocol translator is configured to translate data encoded in a system bus protocol (e.g., data received from the system bus 1708) to data encoded in a local bus protocol (e.g., data transmitted via the local bus 1702 or the local bus 1704).

The output multiplexer 1772 includes an input A (e.g., coupled to a data output of the head protocol translator 1764), an input B (e.g., coupled to a data output of the head protocol translator 1774), an input S (e.g., coupled to an output SELECT1 of the chain base unit controller 1780), an input E (e.g., coupled to an output ENABLE3 of the chain base unit controller 1780), and an output O (e.g., coupled to an input of the upstream data buffer 1726 and to an input of the upstream data buffer 1736, where data indicated by a first upstream frame can be selectively clocked into the upstream data buffer 1726 responsive to the CLOCK2 line, and where data indicated by a second upstream frame can be selectively clocked into the upstream data buffer 1736 responsive to the CLOCK0 line). The output multiplexer 1772 is coupled to select one of the input A or input B responsive to a frame selector (e.g., timer 1782, which is included by the chain base unit controller 1780). The output multiplexer 1772 selection includes a switching of data responsive to an indication of an address. In one example, the indication of an address can be a timeslot ordering associated with the downstream node associated with an instant upstream frame (e.g., one of the first upstream frame and the second upstream frame). The switching of data via the output multiplexer 1772 selection can include (for example) switching of data to a local bus controller that is associated with the instant upstream frame (e.g., either the local bus controller 1720 or the local bus controller 1730).

The chain base unit controller 1780 includes a timer 1782. The chain base unit controller 1780 is configured to control communications between the local interface 1710 and the system interface 1750. The timer 1782 can be configured to indicate (e.g., generate) the divisions of time for controlling the encoding and decoding of data in frames included by an aggregated system frame, such as aggregated control system frame 1310. In at least one example, the timer 1782 is configured to indicate the start of an aggregated control system frame (e.g., the aggregated control system frame 1310) and the start times of each frame included by the aggregated control system frame.

The chain base unit controller 1780 can be a finite state machine that is configured to select a programmed output of an instant state in response to (for example), a previous state, a clock (e.g., a system clock), a timer, a status of a first local bus, and a status of a second local bus. The programmed output for various states can be stored in a physical medium such as a read-only memory (ROM) or programmable gate array (PGA).

In an example system, the system includes: a first local controller having a first upstream port adapted to receive a first downstream transmission from a first upstream node, the first downstream transmission being indicated for transmission to a first downstream node, and the first local controller adapted to transmit a first upstream transmission to the first upstream node via the first upstream port; a second local controller having a second upstream port adapted to receive a second downstream transmission from a second upstream node, the second downstream transmission being indicated for transmission to a second downstream node, and the second local controller adapted to transmit a second upstream transmission via the second upstream port; and a system bus controller having a first downstream port, the system bus controller configured to generate a first downstream frame responsive to the first downstream transmission, the system bus controller configured to generate a second downstream frame responsive to the second downstream transmission, the system bus controller configured to generate a downstream aggregate frame responsive to the first downstream frame and the second downstream frame, the system bus controller configured to transmit the downstream aggregate frame at the first downstream port, the system bus controller adapted to receive an upstream aggregate frame that includes a first upstream frame and a second upstream frame, the system bus controller configured to generate the first upstream transmission responsive to the first upstream frame, and the system bus controller configured to generate the second upstream transmission responsive to the second upstream frame.

The example system can further include remote devices, such as the first upstream node, the second upstream node, the first downstream node and the second downstream node, the first upstream node coupled to the first upstream port, the second upstream node is coupled to the second upstream port, the first downstream node is coupled to the first downstream port, the second downstream node is coupled to the first downstream node, wherein the first downstream node is coupled between the first downstream port and the second downstream node.

In example systems including the remote devices, the system bus controller can be a first system bus controller, the downstream aggregate frame can be a first downstream aggregate frame, the upstream aggregate frame can be a first upstream aggregate frame, and the example system including the remote devices can further include: a third upstream port, a fourth upstream port, a second system bus controller, the second system bus controller having a second downstream port, where the system bus controller is configured to generate a third downstream frame responsive to a third downstream transmission, where the system bus controller is configured to generate a fourth downstream frame responsive to a fourth downstream transmission, where the system bus controller is configured to generate a second downstream aggregate frame responsive to the third downstream frame and the fourth downstream frame, where the system bus controller is configured to transmit the second downstream aggregate frame at the second downstream port, where the system bus controller is adapted to receive a second upstream aggregate frame that includes a third upstream frame and a fourth upstream frame, where the system bus controller is configured to generate a third upstream transmission at the third upstream port responsive to the third upstream frame, and where the system bus controller is configured to generate the second upstream transmission at the fourth upstream port responsive to the second upstream frame.

FIG. 18 is a flow diagram of an example method of wakeup signal promulgation of the example system of FIG. 17A and FIG. 17B. The example method 1800, can include various techniques described herein following. In various implementations, some of the described operations need not always be performed in the described order. In the example method 1800, the method can be initiated at 1802.

At 1802, the method can include receiving, by a first upstream port, a first downstream transmission from a first upstream node, the first downstream transmission being indicated for transmission to a first downstream node. The method can continue at 1804.

At 1804, the method can include receiving, by a second upstream port, a second downstream transmission from a second upstream node, the second downstream transmission being indicated for transmission to a second downstream node. The method can continue at 1806.

At 1806, the method can include generating, by a system bus controller having a first downstream port, a first downstream frame responsive to the first downstream transmission, and generating, by the system bus controller, a second downstream frame responsive to the second downstream transmission. The method can continue at 1808.

At 1808, the method can include generating, by the system bus controller, a downstream aggregate frame responsive to the first downstream frame and the second downstream frame. The method can continue at 1810.

At 1810, the method can include transmitting, at the first downstream port, downstream aggregate frame at the first downstream port. The method can continue at 1812.

At 1812, the method can include receiving, at the first downstream port, an upstream aggregate frame that includes a first upstream frame and a second upstream frame. The method can continue at 1814.

At 1814, the method can include generating, by the system bus controller, a first upstream transmission responsive to the first upstream frame, and generating, by the system bus controller, a second upstream transmission responsive to the second upstream frame. The method can continue at 1816.

At 1816, the method can include transmitting, by the first upstream port, the first upstream transmission to the first upstream node via the first upstream port. The method can continue at 1818.

At 1818, the method can include transmitting, by the second upstream port, the second upstream transmission to the second upstream node via the second upstream port. The method can continue at 1820.

At 1820, the method can optionally include: generating, by the first downstream node, a first downstream information, wherein the first downstream information is included within the first upstream frame. The method can continue at 1822.

At 1822, the method can optionally include generating, by the second downstream node, a second downstream information, wherein the second downstream information is included within the second upstream frame.

Modifications are possible in the described embodiments, and other embodiments are possible, within the scope of the claims.

What is claimed is:

1. A circuit, comprising:
   a first local controller having a first upstream port adapted to be coupled to a first local bus and adapted to receive a first local bus transmission via the first local bus, and the first local controller configured to transmit a first upstream transmission via the first upstream port;
   a second local controller having a second upstream port adapted to be coupled to a second local bus and adapted to receive a second local bus transmission via the second local bus, and the second local controller configured to transmit a second upstream transmission via the second upstream port;
   a system bus controller having a downstream port adapted to be coupled to a system bus, the system bus controller configured to generate a first downstream frame responsive to the first local bus transmission, the system bus controller configured to generate a second downstream frame responsive to the second local bus transmission, the system bus controller configured to generate a downstream aggregate frame responsive to the first downstream frame and the second downstream frame, the system bus controller configured to initiate transmission of the downstream aggregate frame at the downstream port, the system bus controller adapted to receive an upstream aggregate frame that includes a first upstream frame and a second upstream frame, the system bus controller configured to generate the first upstream transmission responsive to the first upstream frame, and the system bus controller configured to generate the second upstream transmission responsive to the second upstream frame; and
   a translator having an input coupled to the downstream port and an output selectively coupled to one of the first upstream port and the second upstream port, the output of the translator selected responsive to an indication of an association between a selected downstream node and a respective upstream frame of the upstream aggregate frame;
   wherein the association between of the selected downstream node and the respective upstream frame of the upstream aggregate frame is indicated by a time of reception by the downstream port of the respective upstream frame.

2. The circuit of claim 1, further comprising a substrate, wherein the first local controller, the second local controller, and the system bus controller are arranged on the substrate.

3. The circuit of claim 2, wherein the substrate is a monolithic semiconductor substrate, and wherein the first local controller, the second local controller, and the system bus controller are formed on the substrate.

4. The circuit of claim 1, further comprising a buffer having an input coupled to the first upstream port and an output coupled to the downstream port, the buffer configured to store an indication of data responsive to the first local bus transmission, wherein the system bus controller is configured to generate the first downstream frame responsive to the indication of data.

5. The circuit of claim 4, wherein the buffer is a first buffer and the indication of data is a first indication of data, and further comprising a second buffer having an input coupled to the second upstream port and an output coupled to the downstream port, the second buffer configured to store a second indication of data responsive to the first local bus transmission, wherein the system bus controller is configured to generate the first downstream frame responsive to the second indication of data.

6. The circuit of claim 5, further comprising a third buffer having an input coupled to the downstream port and an output coupled to the first upstream port, the third buffer configured to generate a third indication of data, wherein the system bus controller is configured to generate the first upstream transmission responsive to the third indication of data.

7. The circuit of claim 6, further comprising a fourth buffer having an input coupled to the downstream port and an output coupled to the second upstream port, the fourth buffer configured to generate a fourth indication of data responsive to the second upstream frame, wherein the system bus controller is configured to generate the second upstream transmission responsive to the fourth indication of data.

\* \* \* \* \*